United States Patent
Klein et al.

(10) Patent No.: US 9,355,055 B1
(45) Date of Patent: May 31, 2016

(54) NETWORK AND POWER CONNECTION MANAGEMENT

(75) Inventors: Matthew D. Klein, Seattle, WA (US); Michael David Marr, Monroe, WA (US)

(73) Assignee: Amazon Technologies, Inc., Reno, NV (US)

( * ) Notice: Subject to any disclaimer, the term of this patent is extended or adjusted under 35 U.S.C. 154(b) by 561 days.

(21) Appl. No.: 13/607,157

(22) Filed: Sep. 7, 2012

(51) Int. Cl.
*G06F 13/00* (2006.01)
*G06F 13/40* (2006.01)

(52) U.S. Cl.
CPC .................................. *G06F 13/4022* (2013.01)

(58) Field of Classification Search
CPC .................................................... G06F 9/4411
USPC .................. 710/104–110, 305–317
See application file for complete search history.

(56) References Cited

U.S. PATENT DOCUMENTS

| | | | |
|---|---|---|---|
| 6,789,150 B1 * | 9/2004 | Jain | 710/305 |
| 6,898,720 B2 * | 5/2005 | Joo et al. | 713/320 |
| 7,386,639 B2 * | 6/2008 | Mahowald et al. | 710/14 |
| 7,966,402 B2 * | 6/2011 | Emerson et al. | 709/226 |
| 8,867,376 B1 * | 10/2014 | Gandham et al. | 370/250 |
| 2008/0222435 A1 * | 9/2008 | Bolan et al. | 713/310 |
| 2009/0248909 A1 * | 10/2009 | Hironaka et al. | 710/18 |
| 2010/0205152 A1 * | 8/2010 | Ansari et al. | 707/654 |
| 2012/0005344 A1 * | 1/2012 | Kolin et al. | 709/226 |
| 2013/0198346 A1 * | 8/2013 | Jubran et al. | 709/220 |

\* cited by examiner

*Primary Examiner* — Raymond Phan
(74) *Attorney, Agent, or Firm* — Lee & Hayes, PLLC

(57) ABSTRACT

The use of asset connectivity verification and switchable asset connectivity activation techniques may reduce or eliminate occurrences of human errors with respect to the improper connection and activation of infrastructure components in a data center. Assert connectivity verification involves the acquisition of identifiers corresponding to infrastructure component interfaces that are coupled to each other, and comparing the identifiers to pairing specifications to verify that the coupling of the infrastructure components comply with pairing specifications. Asset connectivity activation involves determining whether the coupling of a switchable coupler to one or more component interfaces complies with pairing specifications based on the corresponding identifiers of each component, and activating the switchable coupler to enable the flow of data signals and/or power when the coupling of the components meets the pairing specifications.

34 Claims, 12 Drawing Sheets

NETWORK AND POWER CONNECTION MANAGEMENT

BACKGROUND

A data center is a facility that houses servers or other types of computing devices that store or process data on behalf of client devices. The computing devices in a data center may be organized into racks. In turn, the racks of computing devices may be housed in a room in a data center. Furthermore, a data center may include multiple rooms of such racks. Data center technicians are responsible for setting up and maintaining the computing devices in a data center. However, human errors made during the initial setup of computing devices or made during troubleshooting of computing device malfunctions may be difficult to track down due to the sheer number of interconnected computing devices in a data center. While most of such human errors are easily remedied once diagnosed, human errors may nevertheless detract from the overall health and operational efficiency of a data center.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
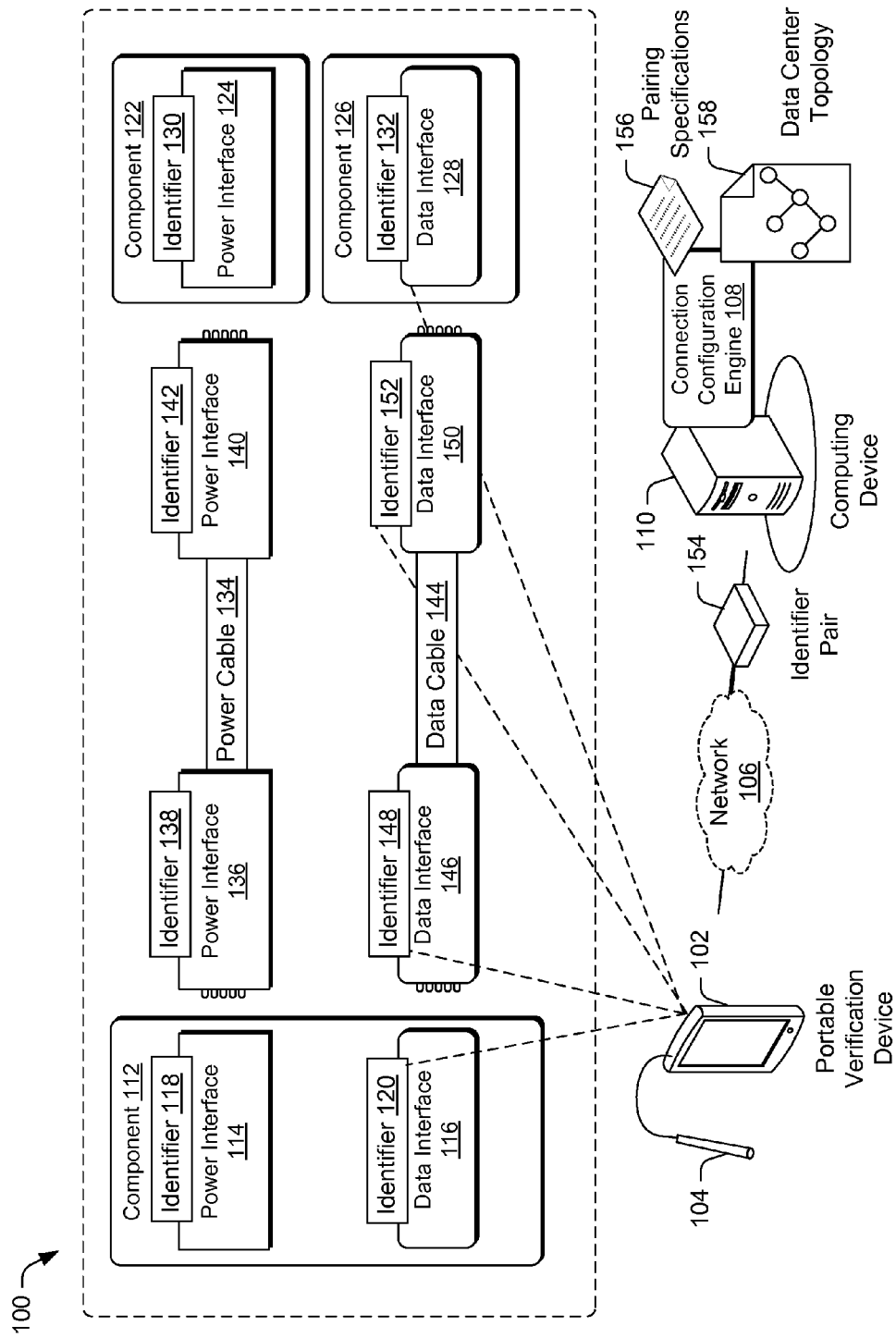
FIG. 1 is a schematic diagram of an illustrative architecture for implementing various embodiments of asset connectivity verification to ensure proper connectivity between infrastructure components in a data center.

The disclosure is directed to architectures and techniques for using asset connectivity verification and switchable asset connectivity activation to ensure that infrastructure components in a data center are properly connected during installation, maintenance, and/or reconfiguration. The infrastructure components may include servers, server racks, power distribution units, routers, switches, switchable couplers, power supply cables, data connectivity cables, backup power units, and/or other computing devices or network-related components that are installed in a data center.

The technique of asset connectivity verification may use the identifiers of component interfaces to ensure that the infrastructure components are properly connected. In some embodiments, each of the infrastructure components may have one or more identifiers, in which each identifier identifies a corresponding component interface. A technician may be prepared to connect two infrastructure components together with a conductive component. For example, the technician may be prepared to connect a power interface of a server to a power interface of a power distribution unit of a server rack using a power cable.

The technician may initially use a portable verification device to acquire the identifier of the power interface on the server and an identifier of a first end of the power cable that is to be connected to the server. The portable verification device may use a data network to report the acquired identifiers to a connection configuration engine. The connection configuration engine may compare the acquired identifiers to pairing specifications. The pairing specifications may denote component interfaces that are to be connected together. Accordingly, the connection configuration engine may send an error message to the portable verification device when the pairing specifications indicate that the component interfaces should not be connected together. Accordingly, the technician may be informed to connect the correct component interfaces. Otherwise, the connection configuration engine may send an approval message to the portable verification device. Once the technician receives the approval message, the technician may proceed with the connection of the interface at the server and the interface at the first end of the power cable. Likewise, the technician may also repeat the acquisition of the corresponding identifiers and the connection of the interface at a second end of the power cable to the interface at the power distribution unit of the server rack in a similar manner. Thus, the use of asset connection verification techniques may ensure that multiple infrastructure components are joined together according to pairing specifications and that particular infrastructure components may be easily located at a future date.

The technique of switchable asset connectivity activation may use switchable couplers to ensure that infrastructure components are properly connected. In various embodiments, a switchable coupler may be a standalone device or alternatively a device that is built into an infrastructure component. The switchable coupler may include an internal switch that is initially open when the switchable coupler is connected to an infrastructure component, so that no power and/or data signals may pass through the switchable coupler. However, the internal switch in the switchable coupler may be closed to permit the passage of power and/or data signals when a closed command is received from the connection configuration engine. Furthermore, each switchable coupler may have a unique identifier (e.g., barcode and/or serial number).

Accordingly, in switchable asset connectivity activation, a technician may initially connect a switchable coupler or a switchable coupler-equipped infrastructure component to one or more interfaces of at least one other infrastructure component. Subsequently, the technician may acquire a corresponding identifier of each interface on the one or more infrastructure components and the identifier of the switchable coupler using the portable verification device. In turn, the portable verification device may use a data network to report the acquired identifiers to a connection configuration engine. The connection configuration engine may compare the identifiers to pairing specifications. Accordingly, the connection configuration engine may send a close command to the switchable coupler when the coupling of the switchable coupler to the one or more interfaces conforms to the pairing specifications. Otherwise, the connection configuration engine may send an error message to the portable verification device, so that a technician may be informed that the connection of the switchable coupler to the one or more infrastructure components is unauthorized.

In accordance with other aspects, the technician may perform similar procedures to restore connectivity by closing the internal switch in the switchable coupler after a repair or a power interruption. A power interruption may be an unforeseeable power loss event that interrupts power to the switchable coupler, or an intentional shutdown of power or data signals that provide power to the switchable coupler. However, in accordance with additional aspects, an installed switchable coupler may have the ability to automatically restore power or data signal connectivity following an interruption event, or restore such connectivity by communicating with the connection configuration engine. Thus, the technique of switchable asset connectivity activation based on the use of switchable coupler may ensure that power and data signals may properly flow between infrastructure components that are connected according to pairing specifications.

The use of the asset connectivity verification and switchable asset connectivity activation techniques may reduce or eliminate occurrences of human errors caused by the improper connection and activation of infrastructure components in a data center. Further, in instances in which equipment or power interruptions occur, the use of such techniques may facilitate the location of failed infrastructure components as well as the proper replacement or repair of such infrastructure components. Further, the techniques may improve data center security by enabling manual validation or integrity checking of the connections between infrastructure components in the event of a power interruption that defaults the switchable couplers to open states. In this way, the overall health and operational efficiency of a data center may be increased with the use of the asset connectivity verification technique and the switchable asset connectivity activation techniques.

Illustrative System Architecture

FIG. 1 is a schematic diagram of an illustrative architecture 100 for implementing various embodiments of asset connectivity verification to ensure proper connectivity between infrastructure components in a data center. A portable verification device 102 may be used to acquire the identifiers of infrastructure component interfaces in a data center. The infrastructure components may include servers, server racks, power distribution units, routers, switches, switchable couplers, power supply cables, data connectivity cables, backup power units, and/or other computing devices or network-related components that are installed in a data center. An infrastructure component interface (e.g., a power interface, a data interface, etc.) may be a connector that an infrastructure component uses to receive or provide power and/or data signals to another infrastructure component.

The portable verification device 102 may be a mobile communication device, a smart phone, a portable computer, a tablet computer, a slate computer, or any other portable electronic device that is equipped with network communication components to receive and transmit data, data processing components to process data, and user interface components to receive data from and present data to a user. For example, the portable verification device 102 may be any device from a hand-held computing device to a computing device that is mounted on a cart for moving about a data center. In various embodiments, the portable verification device 102 may include a scanner component 104 that enables the device to capture visual or electronic data, such as the identifiers of infrastructure component interfaces. In some embodiments, the scanner component 104 may be a barcode scanner or a camera that captures visual codes, such as barcodes, quick response (QR) codes, Aztec Codes, MaxiCodes, text data (e.g., printed serial number), and/or so forth. In other embodiments, the scanner component 104 may be an electronic transceiver that is capable of picking up radio-frequency identification (RFID) information, and/or other forms of short-range radio-based identification information emissions.

The portable verification device 102 may be capable of using a network 106 to communicate with a connection configuration engine 108. The network 106 may be a local area network ("LAN"), a larger network such as a wide area network ("WAN"), a mobile telephone network, and/or a collection of networks, such as the Internet. In some implementations, the portable verification device 102 may communicate with the connection configuration engine 108 via a wireless portion of the network 106. The connection configuration engine 108 may be implemented by one or more computing devices 110. Each of the computing devices 110 may be a server that facilitates the management of a data center.

In various scenarios, the portable verification device 102 may be used to ensure that infrastructure components are properly connected. The various scenarios may include an initial setup of the infrastructure components in the data center, repair of one or more infrastructure components, replacement of one or more infrastructure component, and/or other scenarios. For example, as shown in FIG. 1, an infrastructure component 112 may include a power interface 114 and a data interface 116. The power interface 114 may have an identifier 118, and the data interface 116 may have an identifier 120. Likewise, an infrastructure component 122 may include a power interface 124, and an infrastructure component 126 may include a data interface 128. Moreover, the power interface 124 may have an identifier 130, and the data interface 128 may have an identifier 132. In this example, the infrastructure component 112 may be a server that acquires power from a power source via the power interface 114, and uses the data interface 116 to communicate with other servers. On the other hand, the infrastructure component 122 may be a power supply component that supplies power to the infrastructure component 112 through the power interface 124. The infrastructure component 126 may be a data routing component that provides network connectivity to the component 122 via the data interface 128.

The power interface 114 may be connected to the power interface 124 by a power cable 134. The power cable 134 may include a first power interface 136 that is identified by an identifier 138 and a second power interface 140 that is identified by an identifier 142. Likewise, the data interface 116 may be connected to the data interface 128 by a data cable 144. The data cable 144 may include a first data interface 146 that is identified by an identifier 148 and a second data interface 150 that is identified by an identifier 152. The identifiers may be paired with the interfaces in various ways. In some embodiments, the identifiers may be printed on or near the interfaces such that the identifiers are optically-readable by the portable verification device 102 (e.g., QR codes, barcodes, printed text, etc.). In other embodiments, the identifiers may be stored within electronic tags or emitters that are located on or within the interfaces (e.g., RFID tags, transmitters, etc.), such that the identifiers may be electronically read by the portable verification device 102. Each of the identifiers may uniquely identify a corresponding interface. For example, the identifiers may be globally unique identifiers (GUIDs).

Accordingly, when a technician is ready to connect the data interface 146 of the data cable 144 to the data interface 116 of the infrastructure component 112, the technician may use the portable verification device 102 to acquire the identifier 148 of the data interface 146 and the identifier 120 of the data interface 116. The portable verification device 102 may then upload the identifier pair 154 to the connection configuration engine 108 via the network 106. For example, the technician may navigate to an input interface of the portable verification device 102 that prompts the technician to sequentially scan the identifier 148 and the identifier 120. Subsequently, the technician may enter an upload command to cause the portable verification device 102 to upload the identifier pair 154 to the connection configuration engine 108.

Upon receiving the identifier pair 154, the connection configuration engine 108 may compare the identifier pair 154 to the pairing specifications 156. The pairing specifications 156 may specify the pairings of interfaces. Thus, if the identifier pair 154 is a pairing specified by the pairing specifications 156, then the connection configuration engine 108 may transmit an approval message to the portable verification device 102. In turn, the portable verification device 102 may display the approval message to the technician. For example, the approval message may state, "Interface pairing correct. Please make the connection." Upon reading such an approval message, the technician may connect the data interface 146 to the data interface 116. Otherwise, the connection configuration engine 108 may transmit an error message to the portable verification device 102 for display to the technician. For example, the error message may state, "Interface pairing error. Please verify components to be connected." Upon reading such an error message, the technician may determine that the wrong components are being connected, and select the right components to connect.

In an alternative scenario, prior to acquiring the identifier pair 154, the technician may connect the data interface 146 to the data interface 116 using the portable verification device 102 for transmission to the connection configuration engine 108. In such a scenario, the technician may be responsible for disassembling the connection of the data interface 146 to the data interface 116 if the pairing of the data interface 146 and data interface 116 does not conform to pairing specifications.

However, assuming that the connection of the data interface 146 to the data interface 116 conforms to pairing specifications in each scenario, the connection configuration engine 108 may add information regarding the connection to a data center topology 158. For example, the portable verification device 102 may include a user interface option for the technician to indicate that the connection between the data interface 146 and the data interface 116 is completed. The completion indication is then transmitted by the portable verification device 102 to the connection configuration engine 108 in order to trigger the inclusion of the identifier pair 154 in the data center topology 158. In various instances, the data center topology 158 may facilitate auditing, monitoring, tracking, troubleshooting, and/or repairing of one or more components in the data center.

The technician may verify and connect the data interface 150 of the data cable 144 to the data interface 128 of the infrastructure component 126 in the same manner. In other words, the verification and connection may be facilitated by the checking the pairing of the identifier 152 and the identifier 132 against pairing specifications. Thus, assuming that the connection of data interface 150 to the data interface 128 conforms to pairing specifications, data connectivity may be successfully established between the infrastructure component 112 and the infrastructure component 126. Further, the pairing of the data interface 150 and the data interface 128 may be recorded in the data center topology 158.

While the techniques for asset connectivity verification is described above with respect to data interfaces and data cables, the establishment of a power connection between the infrastructure component 112 and the infrastructure component 122 may be performed using the same asset connectivity verification technique. In other words, the verification and connection of the power interface 136 to the power interface 114 may be facilitated by checking the pairing of the identifier 138 and the identifier 118 against pairing specifications. Likewise, the verification and connection of the power interface 140 to the power interface 124 may be performed using the same asset connectivity verification technique. In other words, the verification and connection of the power interface 140 to the power interface 124 may be facilitated by the checking of identifier 142 and the identifier 130 against pairing specifications. Thus, assuming that such interface pairs conform to pairing specifications, power connectivity between the infrastructure component 112 and the infrastructure component 122 may be successfully established using the power cable 134.

In some alternative embodiments, data connectivity between the infrastructure component 112 and the infrastructure component 122, and/or power connectivity between the infrastructure component 122 and the infrastructure component 126, may be established in the absence of pairing specifications 156. In such embodiments, the technician may be given wide latitude in selecting component that are suitable without adhering to strict component usage specifications. In such embodiments, the connection configuration engine 108 may have the sole role of constructing the data center topology 158 based on the components that are installed. For example, when the technician connects the power interface 136 to the power interface 114, the technician may use the portable verification device 102 to acquire the identifier 138 and the identifier 118. The technician may then use the portable verification device 102 to transmit the identifier pair to the connection configuration engine 108 so that the engine may add information regarding the identifier pair to the data center topology 158. The technician may perform such identifier pair uploads for all connections that are relevant to the data center topology 158.

It will be appreciated that while each of the infrastructure components shown in FIG. 1 includes a specific number of power and/or data interfaces, such infrastructure components are illustrative rather than limiting. Thus, other infrastructure components in accordance with various embodiments may have any numbers and/or combinations of power and/or data interfaces, in which the asset connectivity verification techniques described in FIG. 1 are equally applicable in those embodiments. Further, while the asset connectivity verification techniques are described above with respect to either power interfaces or data interfaces, the techniques are also equally applicable to interfaces that allow the passage of both power and data signals, such as universal serial bus (USB) interfaces. Thus, the asset connectivity verification techniques described herein may be suitable for use with the setup and maintenance of components that conform to a variety of connectivity technologies and standards, including but not limited to, USB, IEEE 1394 serial bus, twisted pair, optical fiber, DisplayPort, high-definition multimedia interface (HDMI), and/or so forth.

Figure 2:
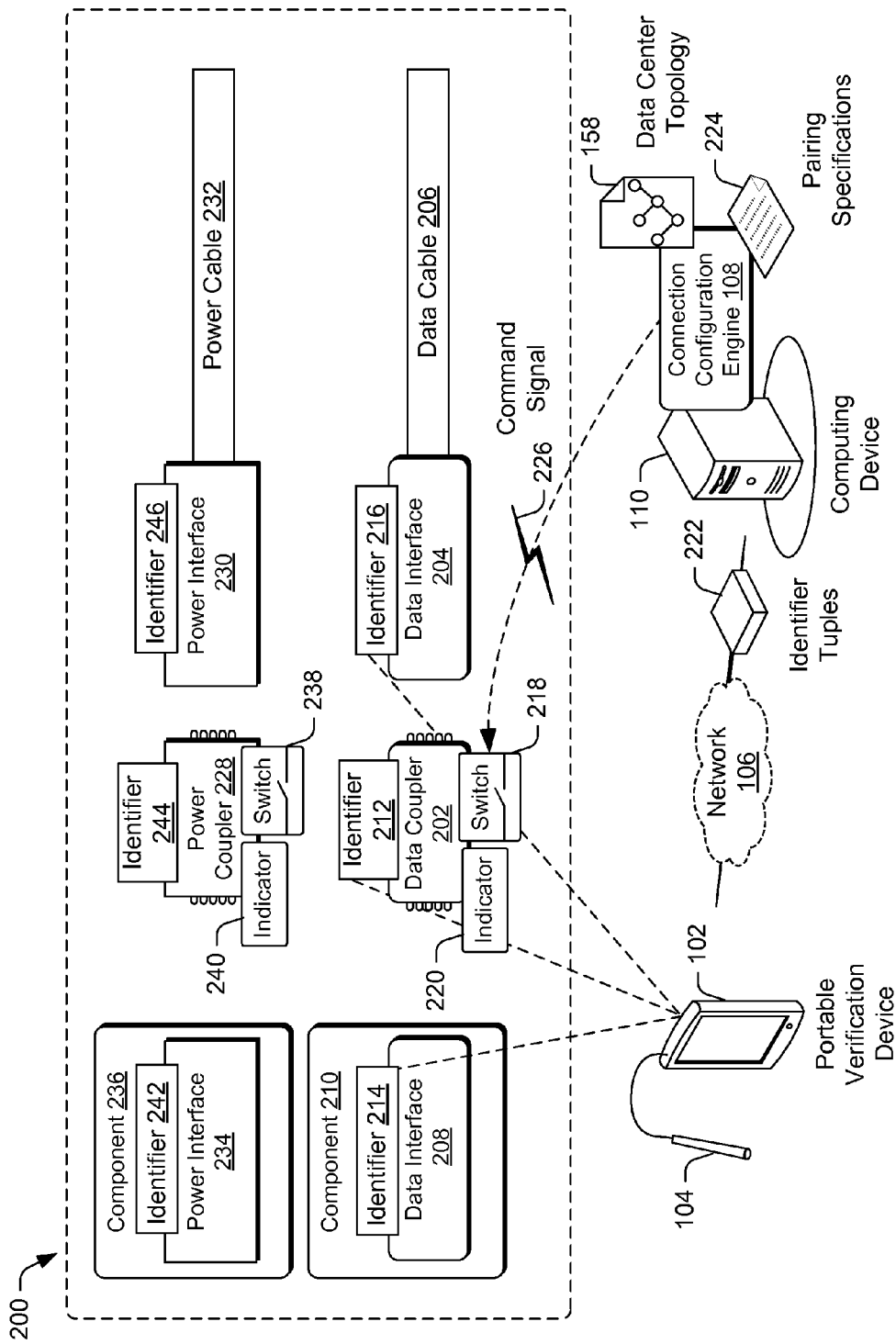
FIG. 2 is a schematic diagram of an illustrative architecture for implementing various embodiments of switchable asset connectivity activation to ensure proper connectivity between infrastructure components in a data center.

FIG. 2 is a schematic diagram of an illustrative architecture 200 for implementing various embodiments of switchable asset connectivity activation to ensure proper connectivity between infrastructure components in a data center. Switchable asset connectivity activation may be implemented using one or more switchable couplers, as well as the portable verification device 102 and the connection configuration engine 108 that resides on the one or more computing devices 110. The connection configuration engine 108 may communicate with the portable verification device 102 and the one or more switchable couplers via the network 106.

As shown in FIG. 2, a data coupler 202 is a switchable coupler that regulates the passage of data signals between infrastructure components. The data coupler 202 is a network addressable coupler that may be coupled between two infrastructure components. For example, the data coupler 202 may attach to both the data interface 204 of the data cable 206 and the data interface 208 of the infrastructure component 210. The data coupler 202 may be identified by an identifier 212. The identifier 212 may be printed on the data coupler 202 in such a way that it is optically-readable by the portable verification device 102. Alternatively, the identifier 212 may be stored with an electronic tag or transmitter that is located on or within the data coupler 202, such that the identifier 212 may be electronically read by the portable verification device 102. The data interface 208 and the data interface 204 may be similarly equipped with identifiers 214 and 216, respectively.

The data coupler 202 may include a switch 218. The switch 218 may be alternatively in an open state or a closed state. When the switch 218 is in an open state, the switch 218 may interrupt the flow of data signals such that the data coupler 202 does not permit the passage of the data signals through the data coupler 202. However, when the switch 218 is in a closed state, the data coupler 202 may permit the passage of data signals. The data signals may be electrical signals, light signals, acoustic signals, and/or so forth. In some embodiments, the switch 218 may be configured to automatically become open when no power (from a data signal or otherwise) is flowing to the data coupler 202. The switch 218 may be remotely triggered to change from an open state to a closed state, or vice versa, by a command signal from the connection configuration engine 108. The connection configuration engine 108 may transmit the signal to the data coupler 202 via the network 106.

The data coupler 202 may further include an indicator 220. The indicator 220 may be a status light (e.g., variable color LED), a liquid crystal display, and/or other signaling component that conveys the status of the data coupler 202. In various embodiments, the indicator 220 may display a first status indicator (e.g., red light) when the data coupler 202 is receiving power but the switch 218 is in an open state. However, when the switch 218 is receiving power and in a closed state, the indicator 220 may display a second status indicator (e.g., yellow light). Alternatively, the indicator 220 may a display a third status indicator (e.g., green light) when the data signals are flowing through the data coupler 202. In this way, a technician may determine the operation status of the data coupler 202 by viewing the indicator 220.

In one scenario, a technician may desire to join the data interface 204 to the data interface 208 using the data coupler 202. For example, the technician may have been asked to connect the infrastructure component 210 to another infrastructure component using the data cable 206. As such, the technician may couple both the data interface 208 and the data interface 204 to the data coupler 202. However, at this point, the switch 218 is in an open state, such that no data flow from the data interface 208 to data cable 206 is possible.

In order to activate the switch 218 to allow the passage of data signals, the technician may use the portable verification device 102 to acquire the identifiers 214 of the data interface 208, the identifier 212 of the data coupler 202, and the identifier 216 of the data interface 204. For example, the technician may navigate to a data coupler activation interface of the portable verification device 102 that prompts the technician to sequentially scan the identifiers. Subsequently, the technician may enter an upload command to cause the portable verification device 102 to upload the identifier tuples 222 to the connection configuration engine 108.

Upon receiving the identifier tuples 222, the connection configuration engine 108 may compare the identifier tuples 222 to the pairing specifications 224. The pairing specifications 224 may designate specific interfaces that are to be joined by particular couplers. Thus, if the identifier tuples 222 are a combination specified by the pairing specifications 156, then the connection configuration engine 108 may transmit a command signal 226 to the data coupler 202 that causes the switch 218 to change from an open state to a closed state. Such a state change may also cause the indicator 220 to display a status indicator that indicates the switch is closed. Accordingly, the lack of a corresponding change in the indicator 220 may alert the technician that the data coupler 202 is potentially defective. For example, along with the transmission of the command signal 225, the connection configuration engine 108 may also send a status change message to the portable verification device 102. In turn, the portable verification device 102 may display the status change message to the technician. For example, the status change message may state, "Coupler #A3792 is now closed, please check indicator light to verify status." In the event that the indicator 220 of the data coupler 202 did not show that the switch 218 has changed from an open state to a closed state, the technician may take remedial action (e.g., report using the portable verification device 102 that the data coupler 202 is defective, and request that the pairing specifications be changed so that a replacement data coupler may be used).

Otherwise, if the identifier tuples 222 are not a combination specified by the pairing specifications 156, the connection configuration engine 108 may transmit an error message to the portable verification device 102 for display to the technician. For example, the error message may state, "Interface pairing error. Please verify components to be connected."

Upon reading such an error message, the technician may determine that the wrong components are being connected, and select the right components to connect.

While the data coupler 202 may exist as a stand-alone component in some embodiments, the data coupler 202 may also be an integral part of another infrastructure component in other embodiments. For example, the data coupler 202 may be incorporated into the data interface 204 of the data cable 206. In such an example, the data coupler 202 may not have an independent identifier. Accordingly, the verification that the connection between the data interface 208 and the data interface 204 conforms to pairing specifications may be based solely on the checking of the identifier 214 and the identifier 216. In an alternative example, the data coupler 202 may be a part of the data interface 208 of the infrastructure component 210, in which case the verification is based on the checking of the identifiers 214 and the identifier 216.

As further shown in FIG. 2, a power coupler 228 is a switchable coupler that regulates the passage of power between infrastructure components. For example, the power coupler 228 may be coupled between the power interface 230 of the power cable 232 and the power interface 234 of the infrastructure component 236. Although the power coupler 228 differs from the data coupler 202 in that the power coupler 228 controls the flow of power rather than data signals, the power coupler 228 may work in a similar manner as the data coupler 202.

In various embodiments, the power coupler 228 may be a network addressable coupler that includes a switch 238 and an indicator 240. The switch 238 may be alternatively in an open state or a closed stated. When the switch 238 is in an open state, the switch 238 may interrupt the flow of power such that the power coupler 228 does not permit the passage of the power through the power coupler 228. However, when the switch 238 is in a closed state, the power coupler 228 may permit the flow of power. In some embodiments, the switch 218 may be configured to automatically become open when no power is flowing to the power coupler 228. The switch 238 may be remotely triggered to change from an open state to a closed state, or vice versa, on its own initiative or by a command signal from the connection configuration engine 108. The connection configuration engine 108 may transmit the signal to the power coupler 228 via the network 106.

The indicator 240 may be a status light (e.g., variable color LED), a liquid crystal display, and/or other signaling component that conveys the status of the power coupler 228. In various embodiments, the indicator 240 may display a first status indicator (e.g., red light) when the power coupler 228 is receiving power but the switch 238 is in an open state. However, when the switch 238 is receiving power and in a closed state, the indicator 240 may display a second status indicator (e.g., yellow light). Alternatively, the indicator 240 may display a third status indicator (e.g., green light) when power is flowing through the power coupler 228 from one infrastructure component to be consumed by another infrastructure component. In this way, a technician may determine the operation status of the power coupler 228 and troubleshoot any problems using the indicator 240, as described above.

The verification of the identifiers for the purpose of closing the switch 238 is also similar to the procedure described above with respect to the data coupler 202. The power interface 234, the power coupler 228, and the power interface 230 may respectively have identifiers 242, 244, and 246. Each of the identifier may be printed or affixed to the corresponding component in the same way as described with respect to the data coupler 202.

Accordingly, when a technician desires to determine whether the attachment of the power coupler 228 between the power interface 234 and the power interface 230 conforms to pairing specifications, the technician may input the identifiers 242, 244, and 246 into the portable verification device 102. In turn, the portable verification device 102 may transmit the acquired identifiers to the connection configuration engine 108. Thus, if the coupling arrangement, as represent by identifier tuples, conforms to pairing specifications, the connection configuration engine 108 may send a command signal for the switch 238 in the power coupler 228 to close. The connection configuration engine 108 may also send a corresponding status change message to the portable verification device 102. Otherwise, if the coupling arrangement is not a combination specified by the pairing specifications 156, the connection configuration engine 108 may transmit an error message to the portable verification device 102 for display to the technician. In some instances, the connection configuration engine 108 may also incorporate a component connection, as represented by the identifier of a switchable coupler and the identifier of each component that is correctly attached to the switchable coupler, into the data center topology 158.

Furthermore, while the power coupler 228 may exist as a stand-alone component in some embodiments, the power coupler 228 may also be an integral part of another infrastructure component in other embodiments. For example, the power coupler 228 may be incorporated into the power interface 230 of the power cable 232, or alternatively, the power interface 234 of the infrastructure component 236. In such examples, the power coupler 228 may not have an independent identifier. Accordingly, the verification that the connection between the power interface 234 and the power interface 230 conforms to pairing specifications, for the purpose of closing the switch 238, may be based solely on the checking of the identifier 242 and the identifier 246.

In additional embodiments, a switchable coupler may combine both the features of the data coupler 202 and the power coupler 228. In other words, such a switchable coupler may include a switch that regulates both the flow of power and data signals. For example, such a switchable coupler may be suitable for use with universal serial bus (USB) components. Thus, embodiments of the switchable couplers described herein may be suitable for use with a variety of connectivity technologies and standards, including but not limited to, USB, IEEE 1394 serial bus, twisted pair, optical fiber, DisplayPort, HDMI, and/or so forth. Further while each of the infrastructure components shown in FIG. 2 includes a specific number of power and/or data interfaces, such infrastructure components are illustrative rather than limiting. Thus, other infrastructure components in accordance with various embodiments may have any numbers and/or combinations of power and/or data interfaces, in which the switchable asset connectivity techniques described in FIG. 2 are equally applicable in those embodiments.

Example Switchable Coupler

Figure 3:
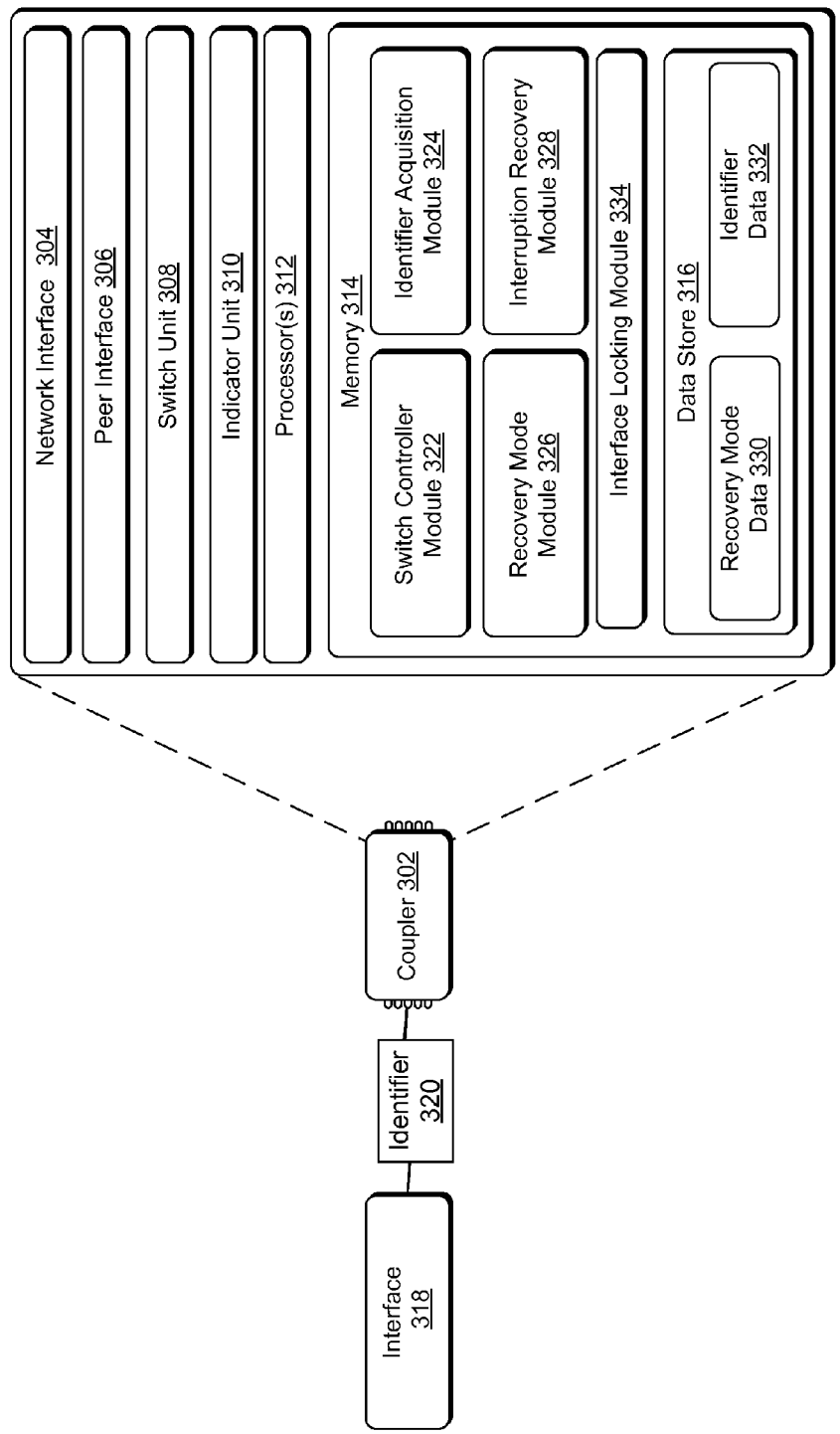
FIG. 3 is a schematic diagram of illustrative components in a switchable coupler that enables switchable asset connectivity activation.

FIG. 3 is a schematic diagram of illustrative components in a switchable coupler 302 that enables switchable asset connectivity activation. The switchable coupler 302 may regulate the flow of data signal and/or power. In various embodiments, the switchable coupler 302 may include a network interface 304, a peer interface 306, a switch unit 308, an indicator unit 310, one or more processors 312, a memory 314, and a data store 316.

The network interface 304 may include wireless and/or wired communication components that enable the switchable coupler 302 to transmit and receive data via the network 106. The communication components may include hardware components, software components, or a combination of both. Accordingly, the network interface 304 may enable the switchable coupler 302 to communication with the connection configuration engine 108 via the network 106.

The peer interface 306 may enable the switchable coupler 302 to communicate with an identifier emitter (e.g., an electronic tag or transmitter) that corresponds to an interface that is attached to the switchable coupler 302 and acquire the identifier of the interface, such as the interface 318. The identifier emitter of the interface 318 may be configured to transmit its identifier 320 to the switchable coupler 302. The interface 318 may transmit the identifier 320 on a periodic basis or upon receiving an identifier request signal from the peer interface 306.

In some implementations, the transmission of the identifier 320 may be achieved via a physical link between the hardware components of the peer interface 306 and the interface 318. For example, the interface of the interface 318 may have a pin that plugs into a corresponding socket of the peer interface 306, so that the identifier 320 may be acquired by the peer interface 306. The socket of the peer interface 306 may be a dedicated contact point or a standard interface contact point that is adapted for use by the switchable coupler 302 to receive identifier information. In other implementations, the transmission of the identifier from the interface 318 to the peer interface 306 may be achieved wirelessly. For example, the peer interface 306 may include a transceiver that is able to read the identifier 320 from a RFID tag, an emitter, or other type of short-range transmitter that is affixed to the interface 318.

In some embodiments, the short-range transmitter may be configured in such a way (e.g., shielded or attenuated) such that the peer interface 306 may only acquire the identifier 320 of the interface 318 when the interface 318 is attached or within a predetermined range to the switchable coupler 302. In other embodiments, the peer interface 306 may have the ability to detect signal strengths of signals. As further described below, the ability to acquire the identifier of an attached interface may enable the switchable coupler 302 to deal with interruption conditions. In additional embodiments, the peer interface 306 may include a transceiver (e.g., near field communication transceiver) that enables the switchable coupler 302 to communicate with the portable verification device 102.

The switch unit 308 may control the flow of power and/or data signals through the switchable coupler 302. The switch unit 308 may be trigger by command signals from the connection configuration engine 108 to change from an open state to a closed state, and/or vice versa. In various embodiments, the switch unit 308 may include an electromechanical switch, a transistor-based switch, an optical switch, and/or so forth. The command signals from the connection configuration engine 108 may be relayed to the switch unit 308 by the network interface 304.

The indicator unit 310 may include hardware and/or software components that show the state of the switch unit 308, as well as whether data signal and/or power are flowing through the switchable coupler 302. The indicator unit 310 may include a status light (e.g., variable color LED), a liquid crystal display, and/or other signaling components that provides differentiated status displays according to the state of the switch unit 308. In various embodiments, the indicator unit 310 may include sensors that detect whether the switch unit 308 is in an open state, a closed state, and/or a state in which power and/or data signals are flowing through the switch unit 308.

The one or more processors 312 may execute software instructions that are stored in the memory 314. The memory 314 may include computer readable media. The computer readable media may include volatile and non-volatile, removable and non-removable media or memory implemented in any method or technology for storage of information such as computer readable instructions, data structures, program modules, or other data. The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. The memory 314 may store a switch controller module 322, an identifier acquisition module, a recovery mode module 326, and an interruption recovery module 328.

The switch controller module 322 may interpret the command signals from the connection configuration engine 108. In turn, the switch controller module 322 may change the switch unit 308 from an open state to a closed state, and/or vice versa based on the command signals. The switch controller module 322 may receive the command signals from the network interface 304.

The identifier acquisition module 324 may use the peer interface 306 to acquire the identifier of one or more interfaces that are attached to the switchable coupler 302, such as the interface 318. In some implementations, the identifier acquisition module 324 may monitor for periodic identifier broadcasts by an attached interface. In other implementations, the identifier acquisition module 324 may send one or more identifier request signals to the attached interface, and the attached interface may respond to the one or more signals with the requested identifier (e.g., identifier 320).

In various embodiments, the attached interface may include a corresponding transmitter that transmits the identifier to the peer interface 306 through a physical contact point (e.g., pin and socket) or a wireless connection. The transmitter may be in the form of a powered transmission component (e.g., active transponder) or a passive electronic tag (e.g., RFID tag). In the case of wireless transmission, the identifier may be one of multiple identifiers that are received by the peer interface 306, as nearby interfaces may also simultaneously transmit other identifiers. In such a case, the identifier acquisition module 324 may perform de-confliction, such as designating the identifier that is being broadcasted with the highest signal strength as the identifier of the attached interface, or using a de-confliction algorithm to differentiate the identifier of the attached interface from the other identifiers.

The recovery mode module 326 may store the recovery mode data 330 in the data store 316. The recovery mode data 330 may dictate whether the switch unit 308 may default to a closed state or an open state after power is restored to the switchable coupler 302 after a power loss. For example, the recovery mode data 330 may be a data bit (e.g., "0" or "1"), in which "0" indicates that the switch unit 308 is to default to an open state upon power restoration, while "1" indicates that the switch unit 308 is to default to a closed state upon power restoration. In various embodiments, the recovery mode module 326 may set the recovery mode data 330 based on mode configuration signals from the connection configuration engine 108 and/or the portable verification device 102.

The interruption recovery module 328 may initiate a recovery procedure when power is restored to the switchable coupler 302 after a power loss. Following the restoration of power, the interruption recovery module 328 may read the recovery mode data 330 to determine whether the switch unit 308 is to default to an open state or a closed state. If the recovery mode data 330 determines that the recovery mode data 330 indicates a closed state, the interruption recovery module 328 may direct the switch controller module 322 to close the switch unit 308, so that the flow of power and/or data signal may be restored.

However, if the recovery mode data 330 indicate an open state, the interruption recovery module 328 may attempt to obtain the identifiers of each interface that is attached to the switchable coupler 302 through the peer interface 306. Once the one or more identifiers are obtained, the interruption recovery module 328 may use the network interface 304 to transmit the identifiers to the connection configuration engine 108 in a recovery request. The interruption recovery module 328 may use exponential back off to repeat such transmission until an acknowledgement is received from the connection configuration engine 108. Based on the identifiers, the connection configuration engine 108 may determine if the arrangement of the switchable coupler 302 and the one or more interfaces are permitted to resume the conduction of power and/or data signals after a power interruption. If such an arrangement is permitted do so, the connection configuration engine 108 may send a close command signal to the switch controller module 322, which may cause the switch unit 308 to change from an open state to a closed state. Otherwise, the connection configuration engine 108 may send an acknowledgement message to the switchable coupler indicating that the identifiers were received and/or that the switchable coupler 302 is to remain in the open state. In response to the acknowledgement message, the interruption recovery module 328 may terminate the transmission of the identifiers.

The data store 316 may store the recovery mode data 330 and the identifier data 332. The identifier data 332 may include the identifier of the switchable coupler 302 in electronic form, such that the identifier may be transmitted to the connection configuration engine 108. The identifier data 332 may further include the identifiers of one or more interfaces that are acquired by the peer interface 306, such as the identifier 320.

In additional embodiments, the switchable coupler 302 may have less than all the components described above. In such embodiments, the switchable coupler 302 may not have the ability to communicate with the connection configuration engine 108. Instead, the switchable coupler 302 may be initially programmed with one or more identifiers of one or more interfaces that the coupler is suppose to couple with via a programming device, such as the portable verification device 102. The identifiers may be stored as part of the identifier data 332. In another example, the switchable coupler 302 may include an optional interface locking module 334 that enables the switchable coupler 302 to enter a program mode in which the switchable coupler 302 may be programmed with one or more identifiers when a user activates a manual switch (e.g., a recessed switch) on the switchable coupler 302. In such a program mode, the interface locking module 334 may automatically save an identifier of any component interface that is currently connected to the switchable coupler 302 as the identifier of a component interface that it is suppose to couple.

In other words, the switchable coupler 302 may be interface locked to one or more component interfaces based on each corresponding saved identifier. As such, the identifier of the switchable coupler in combination with the one or more saved identifiers may become pairing specifications that are locally saved in the data store 316 of the switchable coupler 302.

Accordingly, after power is restored to the switchable coupler 302, the interruption recovery module 328 may use the identifier acquisition module 324 to acquire the one or more identifiers of one or more interfaces that are connected to the switchable coupler 302. Thus, if each connected interface has a corresponding identifier that is initially programmed into the switchable coupler 302 as a part of local pairing specifications by the interface locking module 334, the interruption recovery module 328 may send a command signal for the switch controller module 322 to place the switch unit 308 in a closed state. As such, the switchable coupler 302 in accordance with such embodiments may lack the network interface 304, the recovery mode module 326, and the recovery mode data 330. Instead, the switchable coupler 302 may have a short range interface that enables the switchable coupler 302 to communicate with the programming device, so that identifiers may be added or deleted from the data store 422.

In still other embodiments, the functions that are performed by one or more modules that are stored in the memory 314 may be implemented in hardware rather than as software instructions. For example, one or more fixed hardware logic circuits may implement the functions performed by the one or more modules stored in the memory 314. Further, when the one or more fixed hardware logic circuits are used to implement all of the modules that are stored in the memory 312, the processors 312 may be absent from the switchable coupler 302. In such a scenario, the memory 314 may be solely responsible for storing the recovery mode data 330 and the identifier data 332.

Example Connection Configuration Engine

Figure 4:
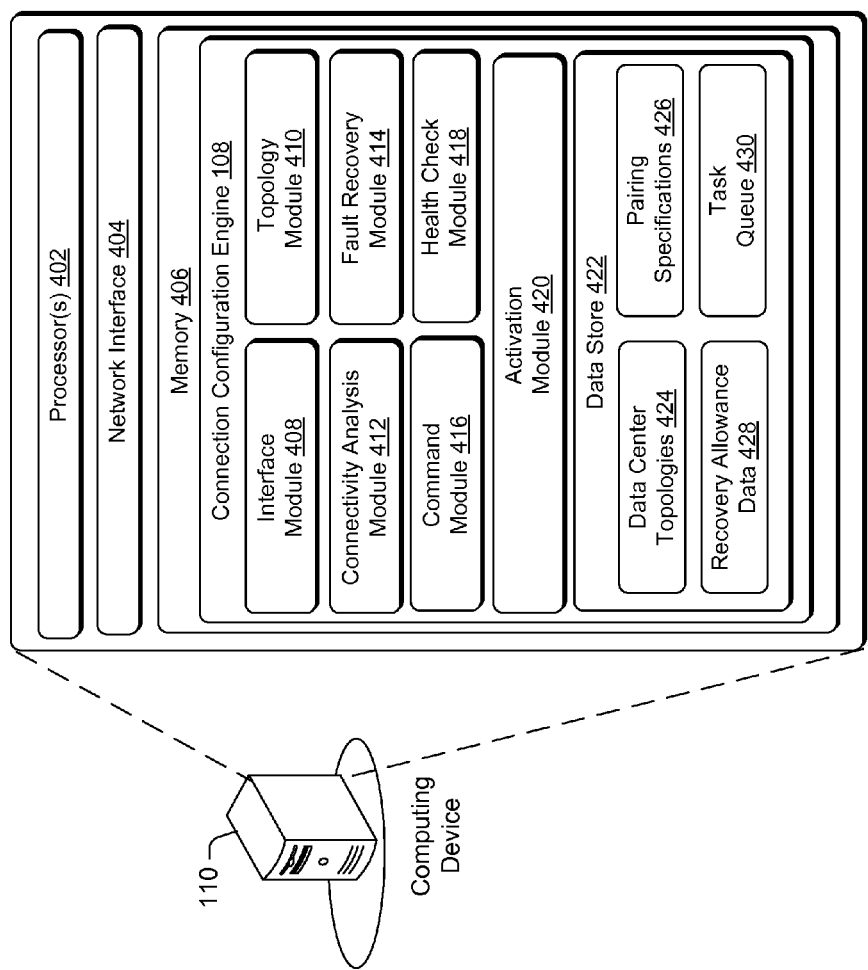
FIG. 4 is a schematic diagram of illustrative components in a connection configuration engine that implements both asset connectivity verification and switchable asset connectivity activation.

FIG. 4 is a schematic diagram of illustrative components in a connection configuration engine 108 that implements both asset connectivity verification and switchable asset connectivity activation. The connection configuration engine 108 may be implemented by the one or more computing devices 110. The computing devices 110 may include processors 402, network interface 404, and memory 406. The memory 406 may include computer readable media. The computer readable media may include volatile and non-volatile, removable and non-removable media or memory implemented in any method or technology for storage of information such as computer readable instructions, data structures, program modules, or other data. The computer-readable media may include non-transitory computer-readable storage media, which may include hard drives, floppy diskettes, optical disks, DVDs, read-only memories (ROMs), CD-ROMs, random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks.

The network interface 404 may include wireless and/or wired communication components that enable the switchable coupler 302 to transmit and receive data via the network 106. The communication components may include hardware components, software components, or a combination of both. Accordingly, the network interface 404 may enable the connection configuration engine 108 to communicate with the switchable coupler 302 via the network 106. The connection configuration engine 108 may include an interface module 408, a topology module 410, a connectivity analysis module 412, a fault recovery module 414, a command module 416, a health check module 418, an activation module 420, and a data store 422.

The interface module 408 may handle communication with the portable verification device 102 and switchable couplers, such as the data coupler 202 and the power coupler 228. The interface module 408 may receive requests and identifiers from the portable verification device 102. In turn, the interface module 408 may pass messages and commands back to the portable verification device 102. The interface module 408 may also send command signals to switchable couplers, such as command signals to open and close switches in the switchable couplers. The interface module 408 may use the network interface 404 to transmit and receive communication data.

The topology module 410 may generate data center topologies based on the identifier pairings and/or sets of identifier tuples that are received from the portable verification device 102. In various embodiments, each identifier pairing or set of identifier tuples may be interpreted by the topology module 410 as designating coupled infrastructure component interfaces. The topology module 410 may store the one or more data center topologies 424 in the data store 422.

The connectivity analysis module 412 may compare identifier pairs and/or a set of identifier tuples that are received from the portable verification device 102 to pairing specifications, such as the pairing specifications 426. Based on such comparison, the connectivity analysis module 412 may determine whether each coupling of infrastructure component interfaces, as represented by a corresponding identifier pair or a set of identifier tuples, is in accordance with pairing specifications. In instances in which a coupling of infrastructure component interfaces does not include a switchable coupler, the connectivity analysis module 412 may generate an approval message if the coupling conforms to pairing specifications. Otherwise, the connectivity analysis module 412 may generate an error message. Such messages may be transmitted to the portable verification device 102 by the interface module 408.

In other instances in which a coupling of infrastructure components includes a switchable coupler, the connectivity analysis module 412 may use the command module 416 to generate a close command signal along with a status change message if the coupling conforms to pairing specifications. The close command signal may command a switch unit in a corresponding switchable coupler to close and allow the passage of power and/or data signals. Otherwise, the connectivity analysis module 412 may generate an error message. Once again, such messages may be transmitted to the portable verification device 102 by the interface module 408. In some embodiments, the error message may provide an override option. The override option may enable a technician to override the pairing specifications and command the connectivity analysis module 412 to issue a close command signal. For example, the technician may initiate an override by submitting a password or code that cause the connectivity analysis module 412 to ignore and/or update the designation specifications, as well as cause the command module 416 to issue the close command signal.

The fault recovery module 414 may assist switchable couplers to resume their closed states after a power interruption. In some implementations, the fault recovery module 414 may receive recovery requests from switchable couplers after an interruption event. Each of the recovery requests may include a set of identifiers that correspond to a group of infrastructure component interfaces that are coupled together. Accordingly, the fault recovery module 414 may compare the set of identifiers to sets of identifiers listed in recovery allowance data 428. The recovery allowance data 428 may designate switchable couplers that may be activated, i.e., switched to closed states. Accordingly, if the fault recovery module 414 determines that a set of identifiers submitted by a switchable coupler matches a set of identifiers designated in the recovery allowance data 428, the fault recovery module 414 may cause the command module 416 to send a close command signal to the switchable coupler. The sets of identifiers in the recovery allowance data 428 may be stored in a data table, a data array, and/or other data storage structures. Otherwise, the fault recovery module 414 may send an acknowledgement message that terminates the transmission of the identifiers by the switchable coupler.

In other implementations, the fault recovery module 414 may actively poll multiple switchable couplers specified in a list for identifiers after a power interruption, rather than passively listen for recovery requests to be received. The fault recovery module 414 may perform such polling with exponential back off, so that the polling of the multiple switchable couplers may be conducted efficiently and without conflict. In still other implementations, the fault recovery module 414 may perform a combination of active polling and listening for identifiers from multiple switchable couplers.

The command module 416 may generate command signals and messages upon request from the connectivity analysis module 412 and the fault recovery module 414. The command signals may include switch open and close command signals. The messages may include approval messages, status change messages, error messages, acknowledgement messages, and/or so forth. The command module 416 may generate additional command signals for other infrastructure components that regulate the flow of power and/or data signals. In some instances, such additional commands may be generated concurrently or sequentially with the generation of command signals and messages for the connectivity analysis module 412 or the fault recovery module 414. For example, the command module 416 may generate a command for a network switching component to transmit data signals and/or a power supply component to distribute power to a downstream switchable coupler, as well as generate a command signal for the downstream switchable coupler to switch to a closed state.

The health check module 418 may generate connectivity verification tasks that are to be performed by a technician. Each connectivity verification task may call for a technician to use the portable verification device 102 to check the identifiers of multiple infrastructure components that are coupled together. The health check module 418 may generate connectivity verification tasks following a restoration of power after a power interruption, in anticipation of a configuration change to one or more infrastructure components, or as part of periodic health status check. The tasks that are generated by the health check module 418 may be stored in a task queue 430 that resides in the data store 422.

The activation module 420 may activate a cluster of infrastructure components that are connected by switchable couplers based on the number of switchable couplers that are in closed stated, i.e., ready to deliver power and/or data signals. For example, the cluster may include multiple servers in a server rack. In one implementation, the activation module 420 may control a main flow of power and/or data signals to the entire cluster of infrastructure components. Accordingly, when the activation module 420 determines that one or more threshold numbers of switchable couplers are in closed states, the activation module 420 may turn on the main flow to the cluster of infrastructure components. Such control by the activation module 420 may ensure that at least a minimal number of infrastructure components are properly configured prior to the cluster being put into service. In other embodiments, the activation of the cluster of infrastructure components when the one or more threshold numbers of switchable couplers are in closed states may be logical in nature. A logical activation of the cluster of infrastructure components may include designating the cluster as ready for service in a data center workload distribution application, so that the cluster may be powered on and placed into service at a future time as needed by the data center workload distribution application.

While the connection configuration engine 108 is described in FIG. 4 as having the modules 408-420, the connection configuration engine 108 may have fewer modules in other embodiments. For example, in an instance in which switchable couplers independently perform recovery from power interruptions, the fault recovery module 414 may be absent from the connection configuration engine 108. In another example in which the connection configuration engine 108 does not generate data center topologies, the topology module 410 may be absent from the connection configuration engine 108. Accordingly, the modules of the connection configuration engine 108 shown in FIG. 4 are illustrative rather than limiting. Furthermore, in additional embodiments, one or more modules of the connection configuration engine 108 may be implemented on the a switchable coupler and/or a portable verification device, so that one or more corresponding tasks that are described as being performed by the connection configuration engine 108 may be performed instead by the switchable coupler or the portable verification device. In some implementations of the additional embodiments, one or more fixed hardware logic circuits may implement the functions performed by the one or more modules on the switchable coupler and/or the portable verification device.

Illustrative Operations

FIGS. 5-12 show illustrative processes 500-1200 that implement network and power connection management. Each of the processes 500-1200 is illustrated as a collection of steps in a logical flow diagram, which represents a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 500-1200 are described with reference to the architecture 100.

Figure 5:
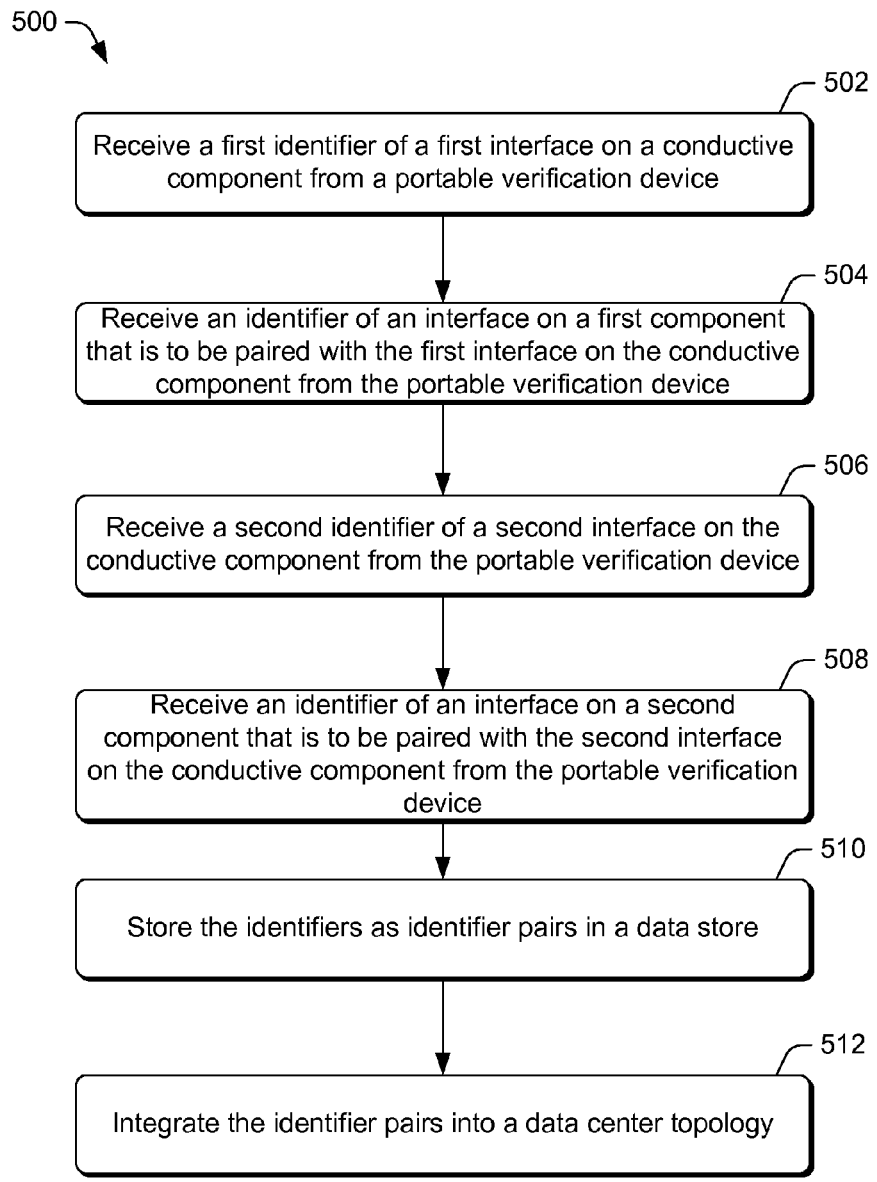
FIG. 5 is a flow diagram of an illustrative process for using asset connectivity verification to create a data center topology during setup of data center components.

FIG. 5 is a flow diagram of an illustrative process 500 for using asset connectivity verification to create a data center topology during setup of data center components. At block 502, the connection configuration engine 108 may receive a first identifier of a first interface on a conductive component from a portable verification device 102. The conductive component may be a cable that conveys power and/or data signals. In the various blocks described in this process, the portable verification device 102 may acquire each identifier by optically reading a printed identifier or electrically obtaining the identifier from an electronic tag or emitter. The acquired identifier is transmitted by the portable verification device 102 to the connection configuration engine 108.

At block 504, the connection configuration engine 108 may receive an identifier of an interface on a first component that is to be paired with the first interface on the conductive component from the portable verification device 102. The first component may be an infrastructure component. At block 506, the connection configuration engine 108 may receive a second identifier of a second interface on the conductive component from the portable verification device 102. At block 508, the connection configuration engine 108 may receive an identifier of an interface on a second component that is to be paired with the second interface on the conductive component from the portable verification device 102. The second component may be an infrastructure component that is different from the first component.

At block 510, the connection configuration engine 108 may store the identifiers that are acquired as identifier pairs in a data store, such as the 422. The first identifier and the identifier of the interface on a first component may be stored as an identifier pair. Likewise, the second identifier and the identifier of the interface on the second component may be stored as an identifier pair.

At block 512, the connection configuration engine 108 may integrate the identifier pairs into a data center topology, such as the data center topology 158, as each identifier represents the placement and/or connection of a corresponding component with respect to another component. In various instances, the data center topology may facilitate auditing, monitoring, tracking, troubleshooting, and/or repairing of one or more infrastructure components in a data center.

Figure 6:
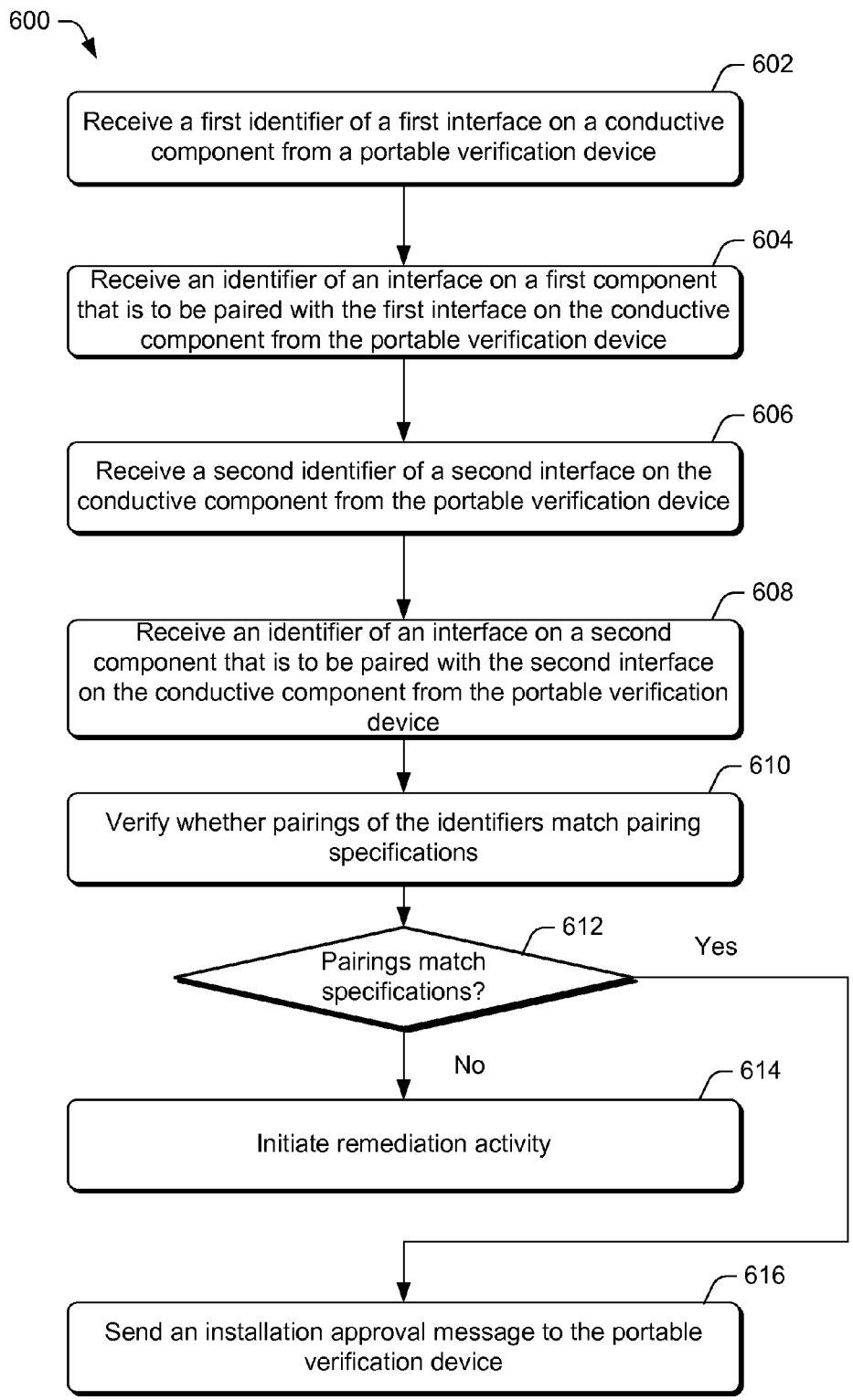
FIG. 6 is a flow diagram of an illustrative process for using asset connectivity verification to ensure that the installation of data center components conforms to pairing specifications.

FIG. 6 is a flow diagram of an illustrative process 600 for using asset connectivity verification to ensure that the installation of data center components conforms to pairing specifications. At block 602, the connection configuration engine 108 may receive a first identifier of a first interface on a conductive component from a portable verification device 102. The conductive component may be a cable that conveys power and/or data signals. In the various blocks described in this process, the portable verification device 102 may acquire each identifier by optically reading a printed identifier or electrically obtaining the identifier from an electronic tag or emitter. The acquired identifier is transmitted by the portable verification device 102 to the connection configuration engine 108.

At block 604, the connection configuration engine 108 may receive an identifier of an interface on a first component that is to be paired with the first interface on the conductive component from the portable verification device 102. The first component may be an infrastructure component. At block 606, the connection configuration engine 108 may receive a second identifier of a second interface on the conductive component from the portable verification device 102. At block 608, the connection configuration engine 108 may receive an identifier of a second component interface that is to be paired with the second interface on the conductive component from the portable verification device 102. The second component may be an infrastructure component that is different from the first component.

At block 610, the connection configuration engine 108 may verify whether pairings of the identifiers match pairing specifications. The pairings of the identifiers may include a first pairing that includes the first identifier and the identifier of the interface on the first component, and second pairing that includes the second identifier and the identifier of the second component.

At decision block 612, if the connection configuration engine 108 determines that at least one of the pairings of the identifiers does not match the pairing specifications ("no" at decision block 612), the process 600 may proceed to block 614. At block 614, the connection configuration engine 108 may initiate remediation activity. In various embodiments, the remediation activity may include sending an error message to the portable verification device 102. The error message may prompt a technician to correct one or more pairing errors (e.g., reverse the orientation of the ends of the conductive components with respect to the first and second components or use another conductive component). The remediation activity may also include issuing a trouble ticket for a technician to correct the one or more pairing errors and/or starting a workflow to perform other associated remediation tasks.

However, if the connection configuration engine 108 determines that the pairings of the identifiers do match the pairing specifications ("yes" at decision block 612), the process 600 may proceed to block 616. At block 616, the connection configuration engine 108 may send an installation approval message to the portable verification device 102. The installation approval message may prompt a technician to couple the conductive component between the first and second components based on an orientation specified by the pairings of the identifiers.

Figure 7:
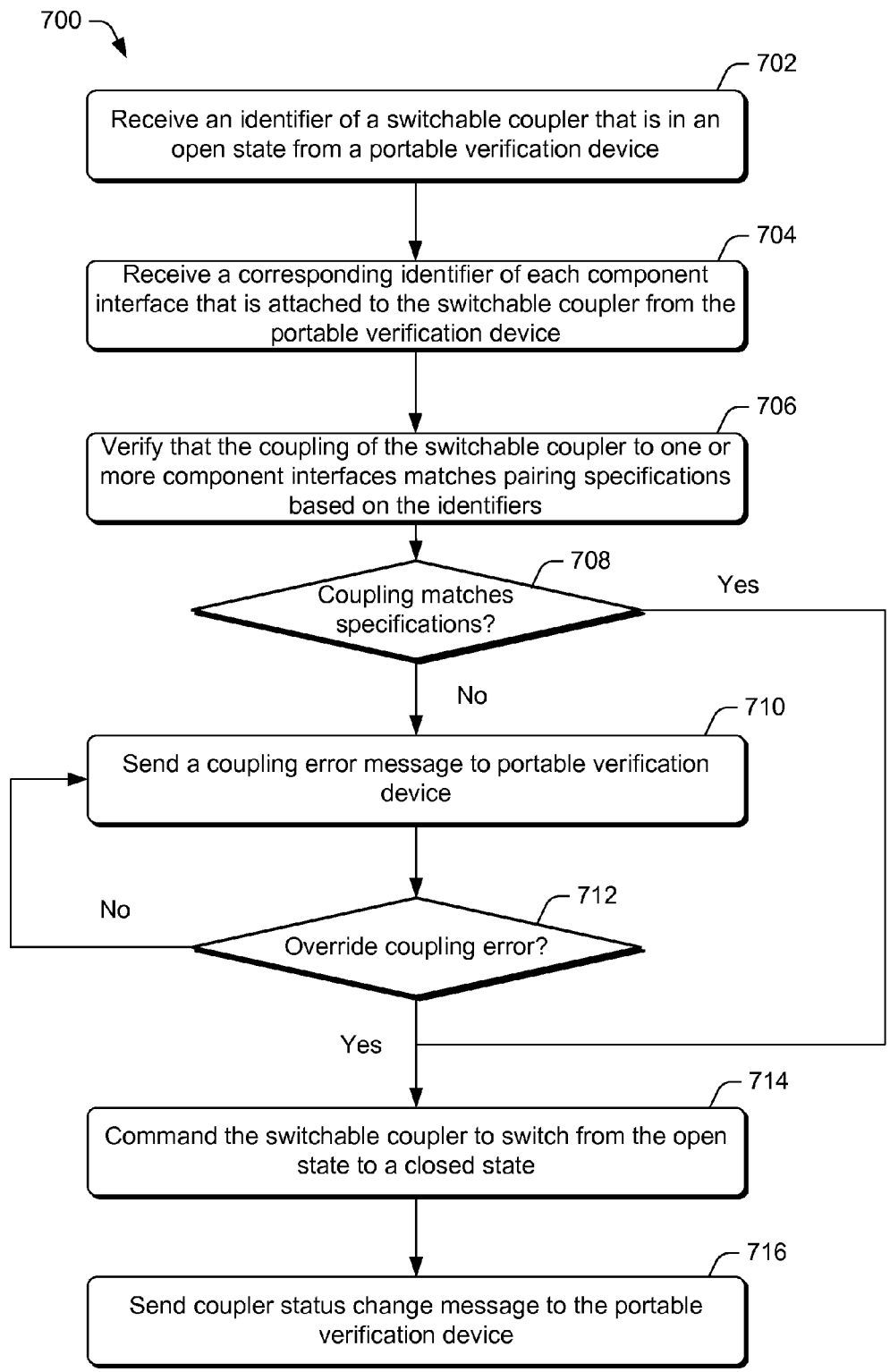
FIG. 7 is a flow diagram of an illustrative process for using switchable asset connectivity activation to ensure that the installation of data center components conforms to pairing specifications.

FIG. 7 is a flow diagram of an illustrative process 700 for using switchable asset connectivity activation to ensure that the installation of data center components conforms to pairing specifications. At block 702, the connection configuration engine 108 may receive an identifier of a switchable coupler that is in an open state from a portable verification device 102. In the various blocks described in this process, the portable verification device 102 may acquire each identifier by optically reading a printed identifier or electrically obtaining the identifier from an electronic tag or emitter. The acquired identifier is transmitted by the portable verification device 102 to the connection configuration engine 108. The switchable coupler may regulate the flow of the power and/or data signals.

At block 704, the connection configuration engine 108 may receive an identifier of each component interface that is attached to the switchable coupler from the portable verification device 102. In various embodiments, the switchable coupler may be attached to one or more infrastructure component interfaces. At block 706, the connection configuration engine 108 may verify that the coupling of the switchable coupler to one or more component interfaces matches pairing specifications. The pairing specifications may designate infrastructure component interfaces that may be connected together.

At decision block 708, if the connection configuration engine 108 determines that the coupling of the switchable coupler and the one or more components does not match the pairing specifications ("no" at decision block 708), the process 700 may proceed to block 710.

At block 710, the connection configuration engine 108 may send a coupling error message to the portable verification device 102. In some embodiments, the coupling error message may include an override option that enables a technician to override the pairing specifications. For example, the technician may initiate an override by submitting a password or code to the connection configuration engine 108 from the portable verification device 102.

At decision block 712, if the connection configuration engine 108 receives an override command for the coupling error ("yes" at decision block 712), the process 700 may proceed to block 714. At block 714, the connection configuration engine 108 may command the switchable coupler to switch from the open state to a closed state. In other words, the connection configuration engine 108 may command the switchable coupler to allow the passage of power and/or data signals.

At block 716, the connection configuration engine 108 may also send a coupler status change message to the portable verification device. The coupler status change message may indicate that the switchable coupler has switched from the open state to the closed state.

Returning to decision block 712, if the connection configuration engine 108 does not receive an override command ("no" at decision block 712), the process 700 may loop back to block 710, at which point the connection configuration engine 108 may send an additional coupling error message to the portable verification device 102.

Returning to decision block 708, if the connection configuration engine 108 determines that the coupling of the switchable coupler and the one or more components matches the pairing specifications ("yes" at decision block 708), the process 700 may proceed directly to block 714.

Figure 8:
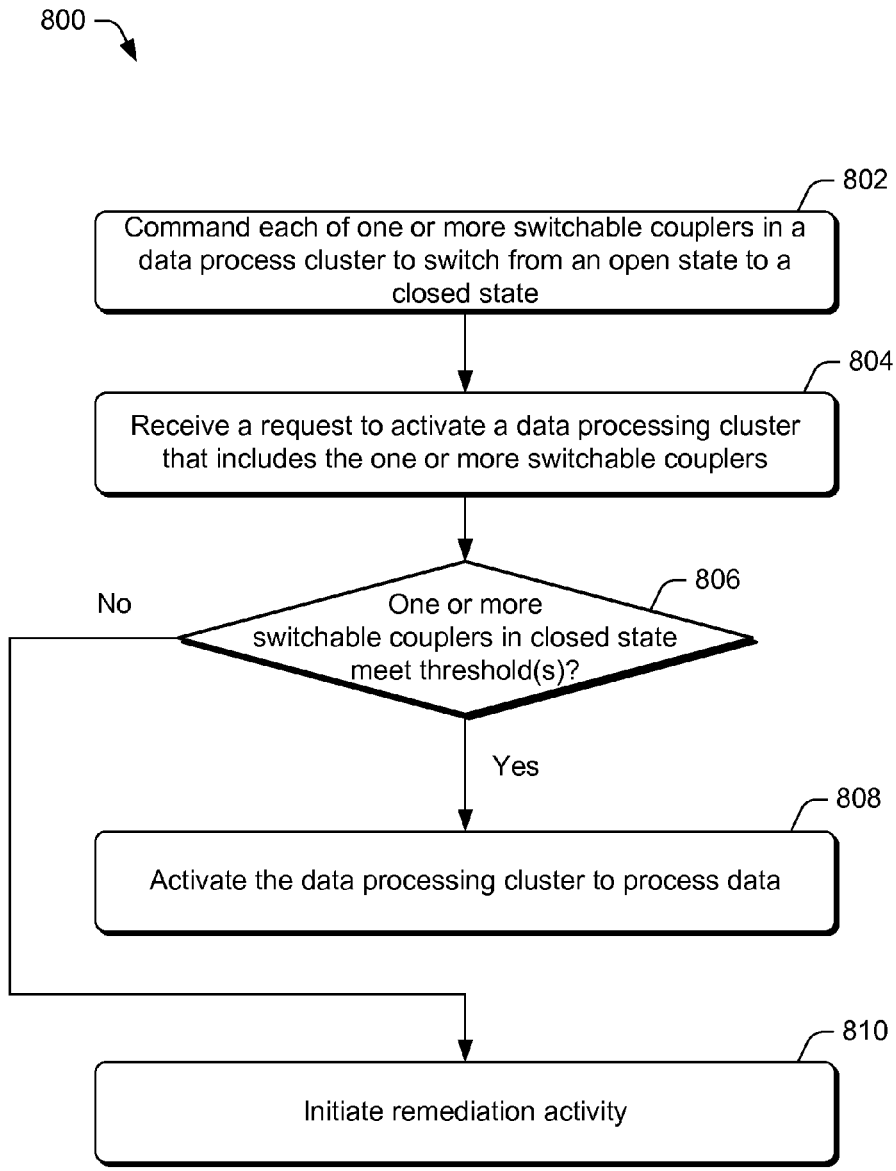
FIG. 8 is a flow diagram of an illustrative process for activation a data processing cluster of components when threshold numbers of switchable couplers in the data processing cluster are in closed states.

FIG. 8 is a flow diagram of an illustrative process 800 for activating a data processing cluster of components when threshold numbers of switchable couplers in the data processing cluster are in closed states. The data processing cluster may be a group of computing infrastructure components (e.g., servers) and associated support infrastructure component (e.g., power supplies, routers, data/power cables, and/or so forth) that function together for the purpose of processing data.

At block 802, the connection configuration engine 108 may command each of one or more switchable couplers to switch from an open state to a closed state. Each of the one or more switchable couplers may be a switchable power coupler (e.g., power coupler 228), a switchable data coupler (e.g., data coupler 202), or a dual-purpose switchable coupler that regulates the passage of both power and data signals.

At block 804, the connection configuration engine 108 may receive a request to activate a data processing cluster that includes the one or more switchable couplers. For example, the data processing cluster may be a server rack that includes servers that are connected to each other and/or a power source by the one or more switchable couplers. The request to activate the data processing cluster may be initiated by a technician using the portable verification device 102 or some other user interface that communicates with the connection configuration engine 108.

At decision block 806, the connection configuration engine 108 may determine whether the one or more switchable couplers that have been closed meet each of one or more state thresholds. In some embodiments, a state threshold may be a total threshold number for one or more switchable couplers, without regard to whether each switchable coupler is a power coupler, a data coupler, and/or dual-purpose coupler. In other embodiments, there may be multiple state threshold values that are to be met, in which the multiple state threshold values include at least two of a threshold number for one or more switchable power couplers that are closed, a threshold number for one or more switchable data couplers that are closed, a threshold number for one or more dual-purpose switchable couplers that are closed, or a total threshold number of switchable couplers that are closed.

Thus, if the connection configuration engine 108 determines that the one or more closed switchable couplers meet each of the one or more state thresholds ("yes" at decision block 806), the process 800 may proceed to block 808. At block 808, the connection configuration engine 108 may activate the data processing cluster to process data. In various embodiments, the activation may include turning on a main flow of power and/or data signals to the data processing cluster of infrastructure components, or logically activating the data processing cluster for future use.

However, if the connection configuration engine 108 determines that the one or more closed switchable couplers does not meet at least one state threshold ("no" at decision block 806), the process 800 may continue to block 810. At block 810, the connection configuration engine 108 may initiate remediation activity. In various embodiments, the remediation activity may include sending an error message indicating each unmet state threshold. The error message may be sent to the portable verification device 102 and/or another user interface device. The remediation activity may also include issuing a trouble ticket for a technician to close additional switchable couplers and/or starting a workflow to perform other associated remediation tasks.

Figure 9:
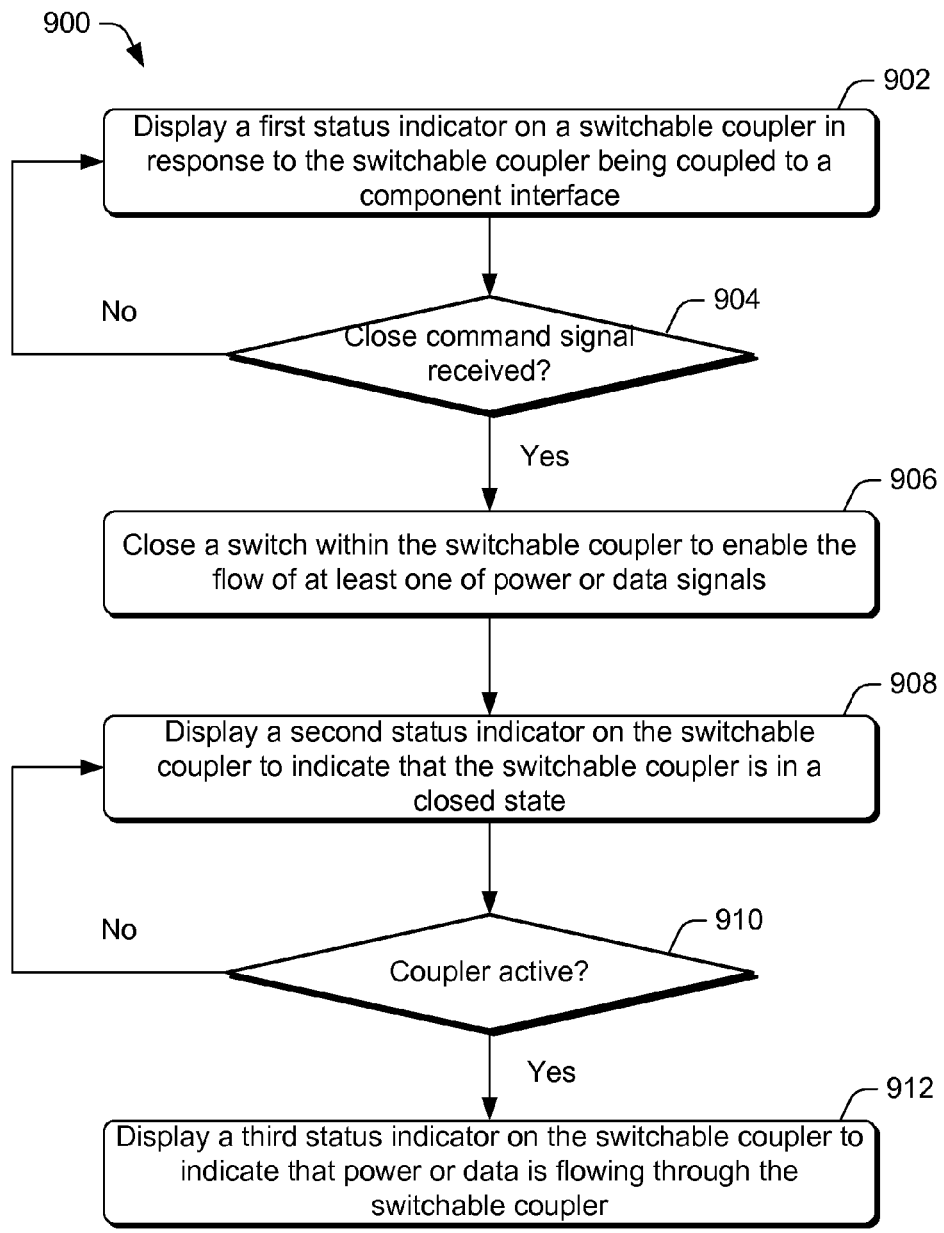
FIG. 9 is a flow diagram of an illustrative process used by a switchable coupler that interconnects infrastructure components to indicate multiple connectivity statuses.

FIG. 9 is a flow diagram of an illustrative process 900 used by a switchable coupler that interconnects infrastructure components to indicate multiple connectivity statuses. At block 902, a switchable coupler may display a first status indicator when the switchable coupler is coupled to one or more infrastructure components. The switchable coupler may be a switchable power coupler, a switchable data coupler, or a dual-purpose switchable coupler that regulates the flow of power and/or data signals. The first status indicator may be displayed by an indicator unit of the switchable coupler. In various embodiments, the indicator unit may be a status light (e.g., variable color LED), a liquid crystal display, and/or other signaling component that conveys the status of the switchable coupler. The first status indicator may indicate that at least one of the infrastructure components is providing power to the switchable coupler.

At decision block 904, the switchable coupler may determine whether a closed command is received from the connection configuration engine 108. Accordingly, if the switchable coupler determines that a close command is received ("yes" at decision block 904), the process 900 may proceed to block 906. At block 906, the switchable coupler may enter a closed state, i.e., close an internal switch to enable the flow of at least one of power or data signals through the switchable coupler.

At block 908, the switchable coupler may display a second status indicator to indicate that the switchable coupler is in the closed state. However, returning to decision block 904, if the switchable coupler determines that a close command signal is not received ("no" at decision block 904), the process 900 may loop back to block 902, so that the first indicator status remains displayed.

At decision block 910, the switchable coupler may determine whether it is active. The switchable coupler may become active when an infrastructure component coupled to the switchable coupler starts to distribute power and/or data signals to another infrastructure component that is attached to the switchable coupler. For example, the switchable coupler may include one or more sensors that detect data and/or power flow. Thus, if the switchable coupler is active ("yes" at decision block 910), the process 900 may proceed to block 912. At block 912, the switchable coupler may display a third status indicator to indicate that power or data is flowing through the switchable coupler.

However, returning to decision block 910, if the switchable coupler is not active ("no" at decision block 910), the switchable coupler loop back to block 908, so that the second status indicator is displayed. In various embodiments, the switchable coupler may be a switchable power coupler, a switchable data coupler, or a dual-purpose switchable coupler that regulates the flow of power and data signals.

Figure 10:
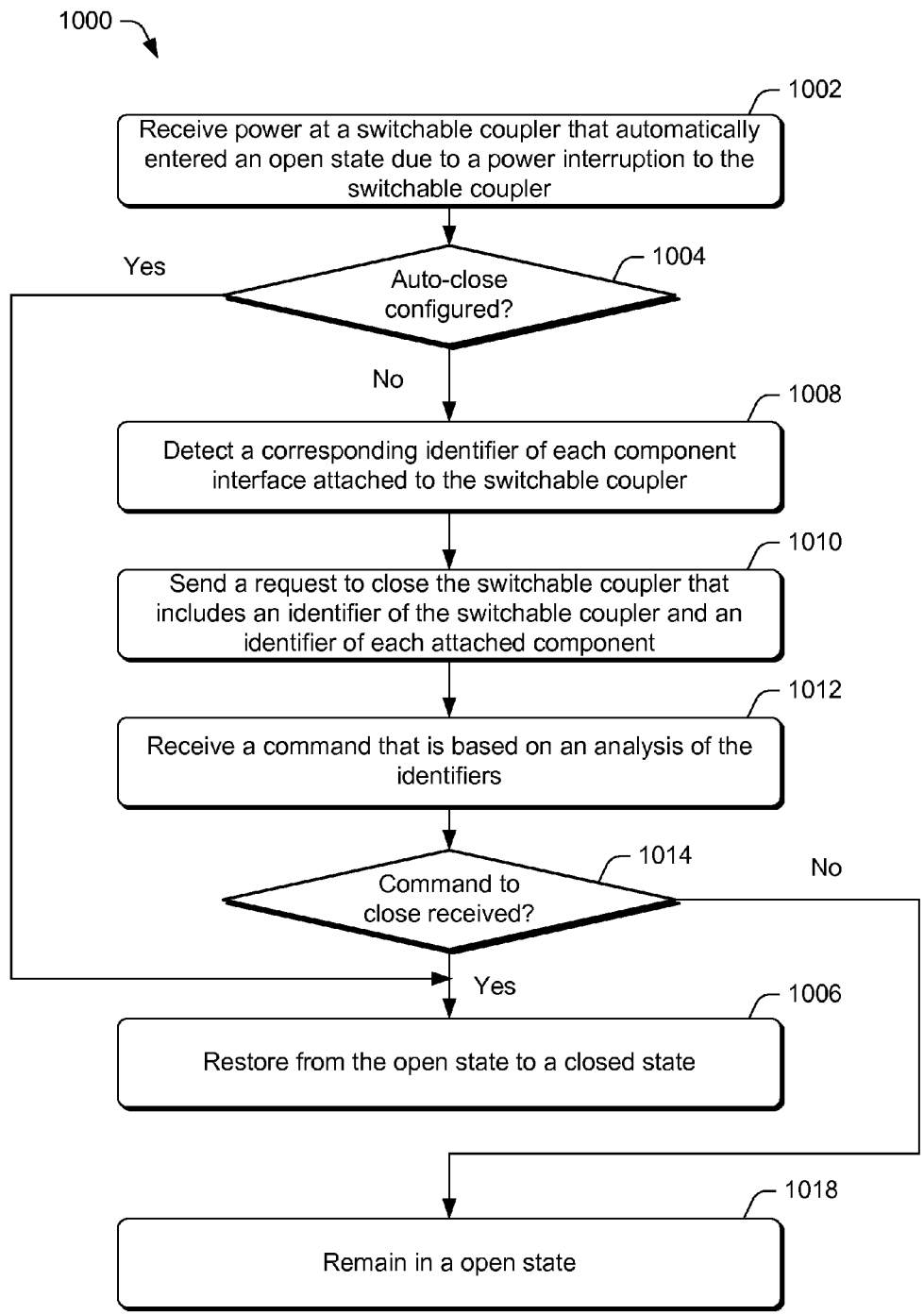
FIG. 10 is a flow diagram of an illustrative process used by a switchable coupler that interconnects infrastructure components to react to a power interruption that affects the infrastructure components.

FIG. 10 is a flow diagram of an illustrative process 1000 used by a switchable coupler that interconnects infrastructure components to react to a power interruption that affects the infrastructure components. At block 1002, a switchable coupler may once again receive power after a power interruption. The switchable coupler may have automatically changed to an open state due to the power interruption to the switchable coupler. The switchable coupler may be a switchable power coupler, a switchable data coupler, or a dual-purpose switchable coupler that regulates the flow of power and/or data signals.

At decision block 1004, the switchable coupler may determine whether a configuration setting allows it to auto-close (i.e., automatically transitions from an open state to a closed state). In various embodiments, the switchable coupler may make such a determination based on recovery mode data (e.g., recovery mode data 330) that is stored in its memory. For example, the recovery mode data may be a data bit (e.g., "0" or "1"), in which "0" indicates that the switch unit 308 is to default to an open state upon power restoration, while "1" indicates that the switch unit 308 is to default to a closed state upon power restoration. Thus, if the switchable coupler determines that auto-close is configured ("yes" at decision block 1004), the process 1000 may proceed to block 1006. At block 1006, the switchable coupler may restore itself from the open state to the closed state.

However, if the switchable coupler determines that auto-close is not configured ("no" at decision block 1004), the process 1000 may proceed to block 1008. At block 1008, the switchable coupler may detect an identifier of each component interface that is attached to the switchable coupler. In various embodiments, the portable verification device 102 may acquire each identifier by optically reading a printed identifier or electrically obtaining the identifier from an electronic tag or emitter.

At block 1010, the switchable coupler may send a recovery request to close the switchable coupler to the connection configuration engine 108. The request may include an identifier of the switchable coupler and an identifier of each attached component. At block 1012, the switchable coupler may receive a command from the connection configuration engine 108. The connection configuration engine 108 may have selected the command based on the identifiers sent by the switchable coupler.

At decision block 1014, the switchable coupler may determine whether the received command is a close command signal. Accordingly, if the command is a close command signal ("yes" at decision block 1014), the process 1000 may proceed to block 1006. At block 1006, the switchable coupler may restore itself from the open state to the closed state.

However, returning to decision block 1014, if the switchable coupler does not receive a close command signal ("no" at decision block 1014), the process 1000 may proceed to block 1018. In various embodiments, the switchable coupler may receive an acknowledgement of the request and/or an open command signal. At block 1018, the switchable coupler may remain in an open state.

Figure 11:
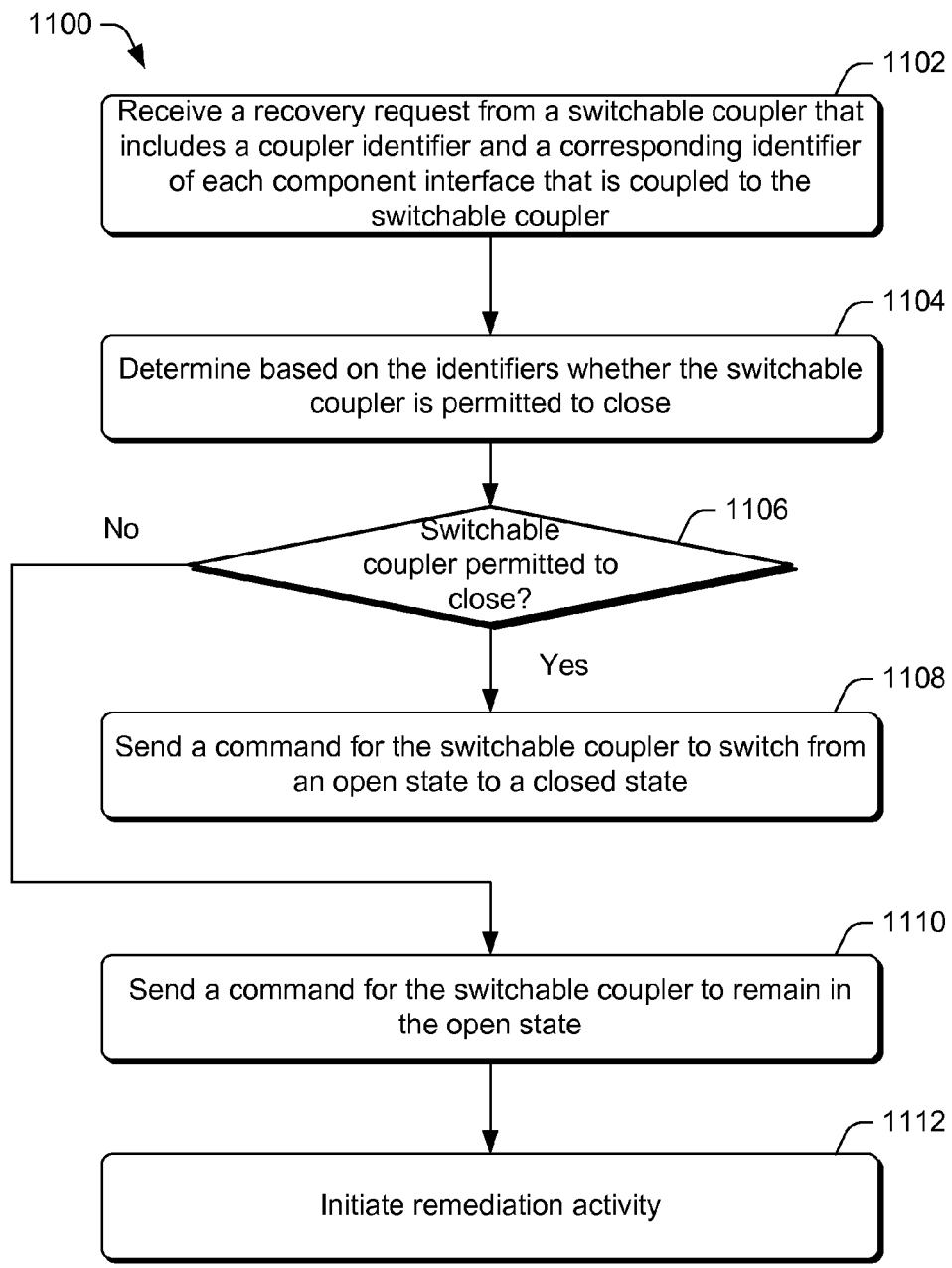
FIG. 11 is a flow diagram of an illustrative process for a connection configuration engine to configure a switchable coupler that interconnects infrastructure components in the event of a power interruption that affects the infrastructure components.

FIG. 11 is a flow diagram of an illustrative process 1100 for a connection configuration engine to configure a switchable coupler that interconnects infrastructure components in the event of a power interruption that affects the infrastructure components.

At block 1102, the connection configuration engine 108 may receive a recovery request from a switchable coupler after a power interruption to one or more infrastructure components that are attached to the switchable coupler. The switchable coupler may be a switchable power coupler, a switchable data coupler, or a dual-purpose switchable coupler that regulates the flow of power and/or data signals. The recovery request may include the identifier of the switchable coupler and an identifier of each component that is coupled to the switchable coupler. The recovery request may be independently initiated by the switchable coupler, or generated by the switchable coupler in response to polling by the connection configuration engine 108.

At block 1104, the connection configuration engine 108 may determine based on the identifiers whether the switchable coupler is permitted to close. In various embodiments, the connection configuration engine 108 may compare the identifiers to the identifiers listed in recovery allowance data, such as the recovery allowance data 428. The recovery allowance data may designate switchable coupler/interface combinations that may be activated, i.e., switched from open states to closed states following a power interruption. Accordingly, the switchable coupler may be closed if the identifiers appear in the recovery allowance data.

Thus, at decision block 1106, if the connection configuration engine 108 determines that the switchable coupler is permitted to close ("yes" at decision block 1106), the process 1100 may proceed to block 1108. At block 1108, the connection configuration engine 108 may send a command for the switchable coupler to switch from an open state to a closed state to the switchable coupler.

However, if the connection configuration engine 108 determines that the switchable coupler is not permitted to close ("no" at decision block 1106), the process 1100 may proceed to block 1110. At block 1110, the connection configuration engine 108 may send a command for the switchable coupler to remain in an open state. Alternatively or concurrently, the connection configuration engine 108 may send a recovery request acknowledgement to the switchable coupler. At block 1112, the connection configuration engine 108 may initiate remediation activity. The remediation activity may include creating a task and/or issuing a trouble ticket for a technician to verify the identifiers of the switchable coupler and the one or more attached components. Once the identifiers are verified with the use of the portable verification device 102, the connection configuration engine 108 may permit the switchable coupler to switch from the open state to the closed state.

Figure 12:
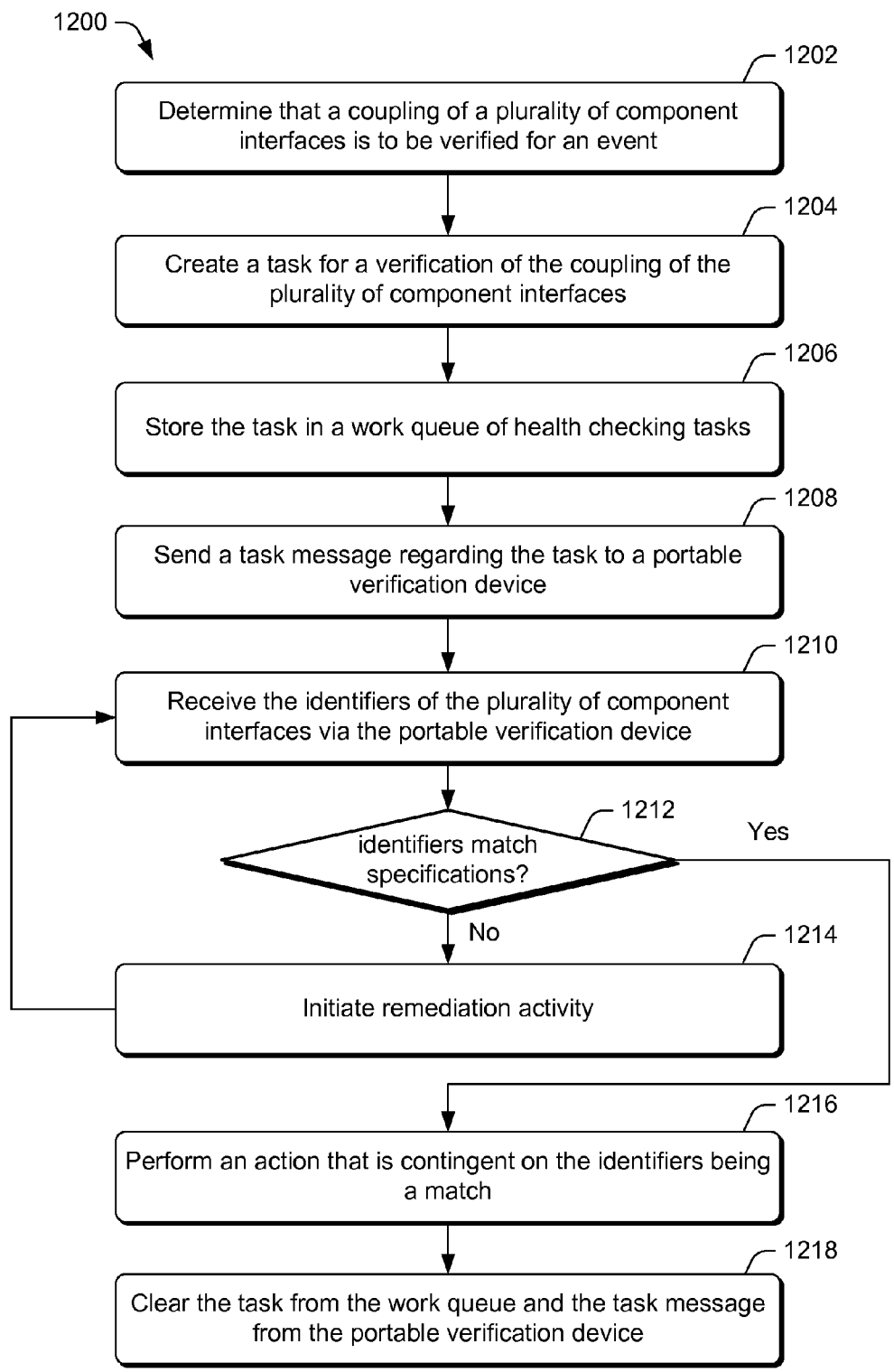
FIG. 12 is a flow diagram of an illustrative process for the connection configuration engine to request verifications of proper connectivity between infrastructure components.

FIG. 12 is a flow diagram of an illustrative process 1200 for the connection configuration engine to request verifications of proper connectivity between infrastructure components. At block 1202, the connection configuration engine 108 may determine that a coupling of a plurality of component interfaces is to be verified for an event. The coupling may include the coupling of one or more infrastructure component interfaces to a switchable coupler (which may be considered a component interface), or the coupling of interfaces belonging to multiple infrastructure components without a switchable coupler. The event may be one of, but not limited to, a configuration modification to one or more servers, repair of one or more servers, decommission of one or more servers, a power interruption to at least one infrastructure component that causes the switchable coupler to default to an open state, or a health check task for a cluster of infrastructure components. The switchable coupler may be a switchable power coupler, a switchable data coupler, or a dual-purpose switchable coupler that regulates the flow of power and/or data signals.

At block 1204, the connection configuration engine 108 may create a task for verification of the coupling of the plurality of component interfaces. The verification may include acquiring the identifiers of the switchable coupler and/or each component interface involved in the coupling using the portable verification device 102, so that the connection configuration engine 108 may compare the coupling of specific component interfaces and/or switchable coupler represented by the identifiers against pairing specifications.

At block 1206, the connection configuration engine 108 may store the task in a work queue of health checking tasks, such as the task queue 430. The work queue may include tasks from other sources. For example, an administrator may have manually entered a specific health checking task using a user interface of the computing devices 110.

At block 1208, the connection configuration engine 108 may send a task message regarding the task to the portable verification device 102. The task message may identify the task based on at least one identifier in the coupling that is to be verified. For example, the task message may state, "scan all the components that are attached to the power coupler #A3434." Alternatively or concurrently, the task message may also identify the coupling to be verified using other location information, such as data center designation, room designation, floor designation, server rack designation, geographical address, geographical location (e.g., latitude, longitude, elevation), and/or so forth. For example, the task message may state, "scan each coupler/component combination for data center #12, room #6, server rack #200." The task message may be continuously or periodically displayed by the portable verification device 102 to a technician until the technician acquires the requested identifiers.

At block 1210, the connection configuration engine 108 may receive the identifiers via the portable verification device 102. The portable verification device 102 may provide the identifiers to the connection configuration engine 108 after the technician has acquired the identifiers.

At decision block 1212, the connection configuration engine 108 may determine whether the identifiers, which represent a specific coupling of component interfaces, match the pairing specifications. Accordingly, if the connection configuration engine 108 determines that at least one of the identifiers does not match the pairing specifications ("no" at decision block 1212), the process 1200 may proceed to block 1214.

At block 1214, the connection configuration engine 108 may initiate remediation activity. The remediation activity may include sending an error correction message and/or issuing a trouble ticket that requests a technician to correct any errors and re-perform the task to the portable verification device 102. The error correction message or trouble ticket may cause the technician to initiate a work flow that troubleshoots the coupling of the switchable coupler to the one or more components. For example, the technician may discover that one or more components were accidentally swapped on a previous date, and swap them back. In some embodiments, the troubleshooting may involve overriding the pairing specifications and submitting the combination of acquired identifiers as a correction to the pairing specifications. Subsequently, the process 1200 may loop back to block 1210. Additionally, in embodiments in which the switchable coupler is a stand-alone coupler that is programmable via a manual switch, the troubleshooting may include instructing a technician to trigger the manual switch to reset the switchable coupler. The reset may cause the switchable coupler to save an identifier of any component interface that is currently connected to the switchable coupler as the identifier of a component interface that it is suppose to couple. Accordingly, the switchable coupler may subsequently switch from an open state to a closed state to permit the passage of power and/or data signals.

However, if the connection configuration engine 108 determines that the identifiers match the pairing specifications ("yes" at decision block 1212), the process 1200 may proceed to block 1216. At block 1216, the connection configuration engine 108 may perform an action that is contingent on the identifiers being match. In various embodiments, the action may be the designation that a repair or modification is complete, the shutoff of power and/or data signals flow to a cluster of infrastructure components, and/or so forth. At block 1218, the connection configuration engine 108 may clear the task from the work queue and the task message from the portable verification device.

The use of the asset connectivity verification and switchable asset connectivity activation techniques may reduce or eliminate occurrences of human errors with respect to the improper connection and activation of infrastructure components in a data center. Further, in instances in which equipment or power interruptions occur, the use of such techniques may facilitate the location of failed infrastructure components as well as the proper replacement or repair of such infrastructure components. In this way, the overall health and operational efficiency of a data center may be increased with the use of the asset connectivity verification technique and the switchable asset connectivity activation techniques.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system, comprising:
    a switchable coupler that couples to one or more component interfaces, the switchable coupler alternates between an open state that shuts off a flow of at least one of data signals or power through the switchable coupler and a closed state that conducts the flow through the switchable coupler;
    a portable verification device that acquires a plurality of identifiers, the plurality of identifiers including an identifier of the switchable coupler and a corresponding identifier of each component interface; and
    a connection configuration engine that receives the plurality of identifiers from the portable verification device, and commands the switchable coupler to switch from the open state to the closed state in response to determining that the plurality of identifiers indicate that coupling of the switchable coupler to the one or more component interfaces meets pairing specifications.

2. The system of claim 1, wherein the connection configuration engine sends a coupling error message to the portable verification device in response to determining that the plurality of identifiers indicate that the coupling of the switchable coupler to the one or more component interfaces fails to meet pairing specifications.

3. The system of claim 1, wherein the connection configuration engine activates a data processing cluster of multiple components that include the switchable coupler in response to determining that a number of switchable couplers having closed states in the data processing cluster meets a threshold.

4. A device, comprising:
    one or more processors;
    memory storing instructions executable by the one or more processors to perform acts comprising:
        receiving a first identifier pair that includes an identifier of a first interface on a conductive component and an identifier of an interface on a first component paired with the first interface from a portable verification device;
        receiving a second identifier pair that includes an identifier of a second interface on the conductive component and an identifier of an interface on a second component paired with the second interface from the portable verification device; and
        integrating the first identifier pair and the second identifier pair into a data center topology that represents placement of multiple components with respect to each other in a network.

5. The device of claim 4, further comprising instructions executable by the one or more processors to perform acts comprising:
    comparing the first identifier pair and the second identifier pair to pairing specifications;
    sending an approval message of a coupling of the conductive component between the interface on the first component and the interface on the second component to the portable verification device in response to determining that the identifier pairs meet pairing specifications; and
    initiating remediation activity in response to determining that at least one of the first identifier pair and the second identifier pair fails to meet pairing specifications.

6. The device of claim 4, wherein individual identifiers are imprinted on or electronically affixed to a corresponding interface, and wherein the portable verification device optically or electronically acquires individual identifiers.

7. The device of claim 4, wherein the conductive component transfers at least one of data signals or power between the first component and the second component.

8. The device of claim 5, further comprising instructions executable by the one or more processors to perform an act of prompting a verification of the coupling, wherein the prompting is performed in anticipation of a configuration change to one or more infrastructure components, following restoration of power after a power interruption, or as a part of a health status check of the one or more infrastructure components.

9. The device of claim 5, wherein the approval message prompts a coupling of the conductive component between the interface on the first component and the interface on the second component based at least on an orientation specified by the first identifier pair and the second identifier pair.

10. The device of claim 5, wherein the remediation activity includes sending an error message or a trouble ticket that prompts a use of another conductive component or a reverse of an orientation of the first interface and the second interface of the conductive component with respect to the interface on the first component and the interface on the second component.

11. One or more computer readable media storing computer-executable instructions that, when executed, cause one or more processors to perform acts comprising:
    receiving an identifier of a switchable coupler that is in an open state from a portable verification device;

receiving a corresponding identifier of individual component interfaces that are attached to the switchable coupler from the portable verification device;

verifying that a coupling of the switchable coupler to one or more component interfaces matches pairing specifications based at least on identifiers received from the portable verification device; and sending a command for the switchable coupler to switch from the open state to a closed state in response to determining that the coupling meets pairing specifications, wherein the open state shuts off a flow of at least one of data signals or power through the switchable coupler and the closed state conducts the flow through the switchable coupler.

12. The one or more computer readable media of claim 11, further comprising sending a coupler status change message to the portable verification device that indicates the coupler switched from the open state to the closed state in response to determining that the coupling of the switchable coupler to the one or more component interfaces meet pairing specifications.

13. The one or more computer readable media of claim 11, further comprising commanding an infrastructure component to provide at least one of power or data signals to the switchable coupler in response to determining that the coupling meets pairing specifications.

14. The one or more computer readable media of claim 11, further comprising initiating remediation activity in response to determining that the coupling of the switchable coupler to the one or more component interfaces fails to meet pairing specifications, the remediation activity includes at least one of sending a coupling error message that indicates the switchable coupler is improperly coupled or issuing a trouble ticket that prompts connection of the switchable coupler to another component interface.

15. The one or more computer readable media of claim 11, further comprising:

receiving a request to activate a data processing cluster that includes a plurality of switchable couplers;

activating the data processing cluster in response to determining that states of the plurality of switchable couplers in the data processing cluster meets one or more state thresholds; and indicating an unmet state threshold in response to determining that the plurality of switchable couplers in the data processing cluster failed to meet a state threshold.

16. The one or more computer readable media of claim 14, further comprising:

receiving an override of the pairing specifications with respect to the coupling in response to the coupling error message; and sending the command for the switchable coupler to switch from the open state to the closed in response to the override.

17. The one or more computer readable media of claim 15, wherein the one or more state thresholds include at least one of a threshold number of one or more data couplers in closed states, a threshold number of one or more power couplers in closed states, a threshold number of dual-purpose couplers in closed states, or a threshold number of the switchable couplers in closed states, wherein each dual-purpose coupler conducts both power and data signals in the closed state.

18. The one or more computer readable media of claim 15, wherein activating includes providing at least one of power or data signals to the data processing cluster.

19. A system, comprising:

a switchable coupler that couples to one or more component interfaces, wherein the switchable coupler alternates between an open state that shuts off a flow of at least one of data signals or power through the switchable coupler and a closed state that conducts the flow through the switchable coupler; and a connection configuration engine that regulates the switchable coupler based at least on comparing, to a pairing specification, an identifier of the switchable coupler and a corresponding identifier of an individual component interface of the one or more component interfaces, and sends a command to the switchable coupler to transition from the open state to the closed state in response to determining, based at least on the comparing, that a coupling of the switchable coupler to the one or more component interfaces complies with pairing specifications.

20. The system of claim 19, wherein the switchable coupler includes a stored recovery data value that causes the switchable coupler to transition from the open state to the closed state after a power interruption.

21. The system of claim 19, wherein the connection configuration engine receives a recovery request from the switchable coupler after a power interruption places the switchable coupler in the open state, the recovery request comprising a plurality of identifiers that include the identifier of the switchable coupler and a corresponding identifier of individual component interfaces.

22. The system of claim 19, wherein the switchable coupler electronically acquires an identifier of a component interface by receiving a transmission of the identifier through a physical connection or a wireless connection with an emitter that corresponds to the component interface.

23. The system of claim 19, wherein the switchable coupler transitions from the open state to the closed state in response to the command.

24. The system of claim 19, wherein the connection configuration engine further creates a task for verifying the coupling represented by the plurality of identifiers, the task to be performed following a power interruption that places the switchable coupler in the open state and prior to switching the switchable coupler to the closed state, as part of a periodic health check on the one or more components, or prior to a modification or repair to a data processing cluster that includes the one or more components.

25. The system of claim 19, wherein the switchable coupler displays a first status indication when the switchable coupler is in the open state, displays a second status indication when the switchable coupler is in the closed state, and displays a third status indication when at least one of data signals or power is flowing between a first component and a second component through the switchable coupler.

26. The system of claim 21, wherein the switchable coupler repeats transmissions of the recovery request to the connection configuration engine according to exponential back off.

27. The system of claim 21, wherein the switchable coupler initiates a transmission of the recovery request in response to polling by the connection configuration engine.

28. The system of claim 21, wherein the command represents a first command, and the connection configuration engine further sends a second command for the switchable coupler to remain in the open state or creates a task for verifying the coupling represented by the plurality of identifiers in response to determining, based on the plurality of identifiers, that the coupling of the switchable coupler to one or more component interfaces fails to match pairing specifications.

29. A switchable coupler, comprising:
- a switch unit component that alternates between an open state that shuts off a flow of at least one of data signals or power through the switchable coupler and a closed state that conducts the flow through the switchable coupler;
- a peer interface component that electronically acquires an identifier of a component interface coupled to the switchable coupler by receiving a transmission of the identifier through a physical connection or a wireless connection with an emitter corresponding to the component interface; and
- an interruption recovery component that sends a command signal for the switch unit component to switch from the open state to the closed state based on a data recovery value that indicates that the switchable coupler is to be in a closed state after a power interruption, or based on a determination that an identifier of the switchable coupler and the identifier of the component interface indicates that a coupling of the switchable coupler and the component interface matches pairing specifications.

30. The switchable coupler of claim 29, further comprising an interface locking component that, following an activation of a manual switch on the switchable coupler, saves an identifier of the interface component that is connected to the switchable coupler and the identifier of the switchable coupler as the pairing specifications in a memory of the switchable coupler.

31. The switchable coupler of claim 29, wherein the interruption recovery component further transmits the identifier of the switchable coupler and the identifier of the component interface to a configuration engine on a computing device, and receives the command signal from the configuration engine when the configuration engine makes the determination.

32. The switchable coupler of claim 29, further comprising a memory that stores identifiers, wherein the interruption recovery component makes the determination by comparing the identifier of the switchable coupler and the identifier of the component interface to the identifiers stored in the memory.

33. The switchable coupler of claim 29, wherein the peer interface component receives multiple identifiers of a plurality of component interfaces, further comprising an identifier acquisition component that performs de-confliction to acquire the identifier of the component interface from the multiple identifiers.

34. The switchable coupler of claim 29, wherein the emitter is an electronic tag or a transmitter that corresponds to the component interface.

* * * * *